US008049867B2

(12) United States Patent
Bridges et al.

(10) Patent No.: US 8,049,867 B2
(45) Date of Patent: Nov. 1, 2011

(54) LASER TRACKER AND METHOD FOR MEASING LOCATION AND ORIENTATION OF A PATTERNED TARGET

(75) Inventors: Robert E. Bridges, Kennett Square, PA (US); Lawrence B. Brown, Cochranville, PA (US); James K. West, Landenberg, PA (US); D. Scott Ackerson, Easton, MD (US)

(73) Assignee: Faro Technologies, Inc., Lake Mary, FL (US)

( * ) Notice: Subject to any disclaimer, the term of this patent is extended or adjusted under 35 U.S.C. 154(b) by 0 days.

(21) Appl. No.: 12/887,990

(22) Filed: Sep. 22, 2010

(65) Prior Publication Data
US 2011/0007305 A1 Jan. 13, 2011

Related U.S. Application Data

(63) Continuation of application No. 12/882,444, filed on Sep. 15, 2010, which is a continuation of application No. 09/621,645, filed on Jul. 24, 2000, now Pat. No. 7,800,758.

(60) Provisional application No. 60/171,474, filed on Dec. 22, 1999, provisional application No. 60/145,686, filed on Jul. 26, 1999, provisional application No. 60/145,315, filed on Jul. 23, 1999.

(51) Int. Cl.
*G01C 3/08* (2006.01)
(52) U.S. Cl. ...................................................... 356/3.01

(58) Field of Classification Search .................. 356/3.01, 356/3.09, 4.01, 4.03, 4.08, 3.1, 3.11, 3.12
See application file for complete search history.

(56) References Cited

U.S. PATENT DOCUMENTS

| 3,610,755 | A | | 10/1971 | Wieberger et al. |
| 3,723,003 | A | | 3/1973 | Vockenhuber et al. |
| 4,020,340 | A | | 4/1977 | Cooke |
| 4,025,193 | A | | 5/1977 | Pond et al. |
| 4,386,848 | A | | 6/1983 | Clendenin et al. |
| 4,436,417 | A | | 3/1984 | Hutchin |
| 4,457,625 | A | | 7/1984 | Greenleaf et al. |
| 4,459,022 | A | | 7/1984 | Morey |
| 4,621,926 | A | * | 11/1986 | Merry et al. ............ 356/508 |
| 4,714,339 | A | | 12/1987 | Lau et al. |

(Continued)

FOREIGN PATENT DOCUMENTS
DE 3205362 A1 8/1983

OTHER PUBLICATIONS

Hecht, Eugene; OPTICS, Second Edition, Adelphi University; ISBN 0-201-11609-X; Copyright 1987. Reprinted with Corrections 1988. pp. 143-144.

(Continued)

*Primary Examiner* — Hwa Lee
(74) *Attorney, Agent, or Firm* — Cantor Colburn LLP

(57) ABSTRACT

A laser tracker includes rotatable structure on which a position detector is disposed. The position detector generates a signal indicating a direction of rotation of the structure so that a beam launched from the structure to a patterned target tracks the patterned target. The laser tracker also includes an optical system that includes a lens and is used to determine the orientation of the patterned target.

32 Claims, 15 Drawing Sheets

U.S. PATENT DOCUMENTS

| | | | |
|---|---|---|---|
| 4,721,385 | A | 1/1988 | Jelalian et al. |
| 4,733,561 | A | 3/1988 | Gilby |
| 4,790,651 | A | 12/1988 | Brown et al. |
| 4,825,394 | A | 4/1989 | Beamish et al. |
| 5,059,789 | A | 10/1991 | Salcudean |
| 5,095,472 | A | 3/1992 | Uchino et al. |
| 5,106,192 | A | 4/1992 | Tucker et al. |
| 5,127,735 | A | 7/1992 | Pitt |
| 5,191,221 | A * | 3/1993 | van Rosmalen et al. ... 250/559.3 |
| 5,198,874 | A | 3/1993 | Bell et al. |
| 5,200,838 | A | 4/1993 | Nudelman et al. |
| 5,267,014 | A | 11/1993 | Prenninger |
| 5,305,091 | A * | 4/1994 | Gelbart et al. ............. 356/620 |
| 5,367,373 | A | 11/1994 | Busch-Vishniac et al. |
| 5,534,993 | A | 7/1996 | Ball et al. |
| 5,555,087 | A | 9/1996 | Miyagawa et al. |
| 5,557,406 | A | 9/1996 | Taylor et al. |
| 5,835,199 | A | 11/1998 | Phillips et al. |
| 5,850,287 | A | 12/1998 | Sorin et al. |
| 5,973,788 | A | 10/1999 | Pettersen et al. |
| 6,017,125 | A | 1/2000 | Vann |
| 6,034,722 | A | 3/2000 | Viney et al. |
| 6,137,569 | A | 10/2000 | Sasaki et al. |
| 6,147,748 | A | 11/2000 | Hughes |
| 6,166,809 | A | 12/2000 | Pettersen et al. |
| 6,504,602 | B1 | 1/2003 | Hinderling |
| 7,196,795 | B2 | 3/2007 | Ura et al. |
| 7,319,511 | B2 * | 1/2008 | Murai et al. ............. 356/4.03 |
| 7,576,847 | B2 * | 8/2009 | Bridges .................. 356/138 |

OTHER PUBLICATIONS

Abbas, G.L., et al.; "Ladar Fiber Optic Sensor System for Aircraft Applications"; SPIE vol. 1799; p. 120-24; 1992.

Barnard, T. W., et al.; "Digital Laser Ranging and Tracking Using a Compound Axis Servomechanism"; Applied Optics; vol. 5, No. 4; p. 497-505; Apr. 1966.

Lucy, R. F., et al.; "Precision Laser Automatic Tracking System"; Applied Optics; vol. 5, No. 4; p. 517-524; Apr. 1966.

Nakamura, O., et al.; "A Laser Tracking Robot-Performance Calibration System Using Ball-Seated Bearing Mechanisms and a Spherically Shaped Cat's-eye Retroreflector"; Rev. Sci. Instrum.; vol. 65, No. 4; p. 1006-1011; Apr. 1994.

Sullivan, L. J.; "Infrared Coherent Radar"; SPIE; vol. 227, CO2 Laser Devices and Applications; p. 147-161; 1980.

Takatsuji, T., et al.; "The First Measurement of a Three-Dimensional Coordinate by use of a Laser Tracking Interferometer System Based on Trilateration"; Measurement Science & Technology; vol. 9, No. 1; p. 38-41; 1998.

Takatsuji, T., et al.; "Restriction on the Arrangement of Laser Trackers in Laser Trilateration"; Measurement Science & Technology; vol. 9, p. 1357-1359; 1998.

Takatsuji, T.,e t al.; "Laser Tracking Coordinate Measuring System Developed by NRLM"; Proceedings of the International Dimensional Metrology Workshop; E. Pritchard (editor), conducted in Knoxville, TN in May 1999.

* cited by examiner

PERSPECTIVE VIEW

FRONT VIEW

PERSPECTIVE VIEW

FRONT VIEW

PERSPECTIVE VIEW

FRONT VIEW

PERSPECTIVE VIEW

FRONT VIEW

LASER TRACKER AND METHOD FOR MEASING LOCATION AND ORIENTATION OF A PATTERNED TARGET

CROSS-REFERENCE TO RELATED APPLICATIONS

The present application is a Continuation Application of U.S. Ser. No. 12/882,444 filed on Sep. 15, 2010, which claims the benefit of U.S. patent application Ser. No. 09/621,645 filed on Jul. 24, 2000, now U.S. Pat. No. 7,800,758, 60/171,474 filed Dec. 22, 1999, 60/145,686 filed Jul. 26, 1999 and 60/145,315 filed Jul. 23, 1999, which are hereby incorporated by reference. The present application also hereby incorporates by reference U.S. patent application Ser. No. 09/285,654 filed Apr. 5, 1999.

BACKGROUND OF THE INVENTION

1. Field of the Invention

The present invention relates to a coordinate measuring device and, more particularly, to a laser based coordinate measuring device.

2. Discussion of the Related Art

There is a class of instrument that measures the coordinates of a point by sending a laser beam to a retroreflector target that is in contact with the point. The instrument determines coordinates by measuring the distance and the two angles to the retroreflector target. There is another class of instrument that is capable of measuring the three orientation angles (pitch, yaw, and roll) of a retroreflector target. If such an instrument can also measure the three coordinates of a point in space, it is said to measure six degrees of freedom. However, such six degree-of-freedom systems, whether or not they are employing laser techniques, are generally inaccurate, slow, limited in radial or angular range, and/or expensive. Exemplary systems for determining position (three to six degrees of freedom) are described by U.S. Pat. No. 4,790,651 to Brown et al.; U.S. Pat. No. 4,714,339 to Lau et al.; U.S. Pat. No. 5,059,789 to Salcudean; U.S. Pat. No. 5,367,373 to Busch-Vishniac et al.; U.S. Pat. No. 5,973,788 to Pettersen et al.; and U.S. Pat. No. 5,267,014 to Prenninger, et al. (the disclosures of which are hereby incorporated by reference).

The laser tracker is a particular type of coordinate-measuring device that tracks the retroreflector target with one or more laser beams it emits. To provide a beam-steering mechanism for this tracking function, laser trackers conventionally include a stationary base onto which a rotating stage or platform is mounted. Until now, most laser trackers have used optical elements, such as mirrors or prisms, to steer the laser beam from its source in the base to optics in the rotating stage and through or off those optics toward the retroreflector. These optical elements and their mounts are costly. Also, they are subject to tilting and bending as a result of thermal and/or mechanical stresses that are usually present in tracker work environments. The consequence of these stresses is reduced accuracy and stability. Examples of beam-steering laser trackers are described by Lucy, et al., *Applied Optics*, pp. 517-524, 1966; Bernard and Fencil, *Applied Optics*, pp. 497-505, 1966; Sullivan, *SPIE*, Vol. 227, pp. 148-161, 1980; U.S. Pat. No. 4,020,340 to Cooke; U.S. Pat. No. 4,025,193 to Pond; U.S. Pat. No. 4,386,848 to Clendenin et al.; U.S. Pat. No. 4,436,417 to Hutchin; U.S. Pat. No. 4,457,625 to Greenleaf et al.; U.S. Pat. No. 4,714,339 to Lau et al.; U.S. Pat. No. 4,721,385 to Jelalian et al.; Gennan Patent DE 3205362 A1 to Pfeifer et al. (which are hereby incorporated by reference). An example of a beam-steering mechanism that uses prismatic optical elements is described by U.S. Pat. No. 4,790,651 Brown et al. (which is hereby incorporated by reference).

A device that is closely related to a laser tracker is the laser scanner. The laser scanner steps one or more laser beams to points on a diffuse surface. The laser tracker and laser scanner are both coordinate-measuring devices. It is common practice today to use the term laser tracker to also refer to laser scanner devices having distance-and angle-measuring capability. This broad definition of laser tracker, which includes laser scanners, is used throughout this application.

An alternative to steering the laser beam with a mirror or prism is to launch the laser beam from an optical fiber mounted on a rigid platform. Although such devices have been built, none has taken full advantage of the simplicity, stability, and flexibility possible with such an approach. For example, such systems usually require separate optical fibers for transmitting and receiving the laser light. An exemplary system that tracks a laser beam launched from an optical fiber is described in Nakamura, et al., *Review of Scientific Instruments*, pp. 1006-1011, 1994; Takatsuji et al., *Measurement Science & Technology*, pp. 38-41, 1998; Takatsuji, et al., *Measurement Science & Technology*, pp. 1357-1359, 1998; and Takatsuji, et al., *Dimensional Metrology in the 21$^{st}$ Century*, International Dimensional Metrology Workshop sponsored by Oak Ridge Metrology Center, May 10-13, 1999 (which are hereby incorporated by reference). Non-tracking systems that launch laser beams from optical fibers are numerous in the prior art and include U.S. Pat. No. 4,459,022 to Morey; U.S. Pat. No. 5,095,472 to Uchino, et al.; U.S. Pat. No. 5,198,874 to Bell et al.; U.S. Pat. No. 5,200,838 to Nudelman; U.S. Pat. No. 5,402,230 to Tian, et al.; U.S. Pat. No. 5,508,804 to Furstenau; and U.S. Pat. No. 5,557,406 to Taylor (which are hereby incorporated by reference).

SUMMARY OF THE INVENTION

Accordingly, the present invention is directed to a laser-based coordinate measuring device that substantially obviates one or more of the problems due to limitations and disadvantages of the related art.

An object of the present invention is to provide a laser-based coordinate measuring device with improved laser beam steering, six degree of freedom measurements, and capability to locate multiple retroreflectors distributed throughout large volumes.

Another object of the present invention is to provide a reliable laser-based coordinate measuring device that is easily manufactured at a low cost without complex beam-steering optics.

Additional features and advantages of the invention will be set forth in the description that follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a laser based coordinate measuring device for measuring a position of a remote target comprising a stationary portion having at least a first laser radiation source and at least a first optical detector; a rotatable portion that is rotatable with respect to the stationary portion; and at least a first optical fiber system for optically interconnecting the first laser radiation source and the first optical detector with an emission end of the first optical fiber system, the emission end disposed on the rotatable portion for emitting laser radiation to the remote target and for receiving laser radiation reflected from the remote target, wherein an emission direction of the laser radiation is controlled according to the rotation of the rotatable portion.

In another aspect, a laser based coordinate measuring device comprises a rigid structure rotatable about two substantially orthogonal axes; a laser radiation source disposed off the rigid structure to provide laser radiation; an optical detector disposed off the rigid structure; a retroreflective target disposed remote from the rigid structure; a first optical fiber path optically coupled with the laser radiation source to transmit laser radiation from the laser radiation source to the rigid structure, the first optical fiber path having an end disposed on the rigid structure for emitting the laser radiation to the retroreflective target according to an orientation of the rigid structure and for receiving retroreflected radiation reflected by the retroreflective target; and an optical coupler optically connecting the optical detector with the first optical fiber path to receive the retroreflected radiation.

In another aspect, a laser based coordinate measuring device for measuring a position of a remote target comprises a stationary portion having at least a first laser radiation source; a rotatable portion that is rotatable about first and second axes of rotation with respect to the stationary portion; an optical fiber path for optically interconnecting the first laser radiation source with the rotatable portion, wherein a first portion of the optical fiber path is disposed along the first axis and a second portion of the optical fiber path is disposed along the second axis.

In another aspect, a laser based coordinate measuring device comprises a structure rotatable about two substantially orthogonal axes; a laser radiation source disposed off the rotatable structure to provide laser radiation; a retroreflective target disposed remote from the rotatable structure, the retroreflective target having a pattern thereon; an optical system for directing the laser radiation from the laser radiation source to the rotatable structure and then to the retroreflective target in accordance with the rotation of the rotatable structure, the retroreflective target reflecting the laser radiation to the rotatable structure; and an orientation camera optically coupled with the reflected laser radiation to determine an orientation of the retroreflective target, the orientation camera including a detector and a lens system that forms an image of the pattern on the detector.

In another aspect, a laser based coordinate measuring device comprises a structure rotatable about two substantially orthogonal axes; a laser radiation source disposed off the rotatable structure to provide laser radiation; a retroreflective target disposed remote from the rotatable structure; an optical system for directing the laser radiation from the laser radiation source to the rotatable structure and then to the retroreflective target in accordance with the rotation of the rotatable structure, the retroreflective target reflecting the laser radiation to the rotatable structure; and an orientation camera disposed on the rotatable structure and optically coupled with the reflected laser radiation to determine a three dimensional orientation of the retroreflective target.

In another aspect, a laser based coordinate measuring system comprises a structure rotatable about two substantially orthogonal axes; a target disposed remote from the rotatable structure; a locator camera disposed on the rotatable structure for determining an approximate location of the target; and an actuator system to orient the rotatable structure in accordance with the location determined by the locator camera.

In another aspect, a laser based method for measuring coordinates of a remote retroreflective target comprises the steps of coupling laser radiation into a first end of an optical fiber path, the optical fiber path having a second end disposed on a rotatable structure; controlling the rotation of the rotatable structure to direct the laser radiation to the remote retroreflective target; coupling a first portion of retroreflected laser radiation with an orientation camera; coupling a second portion of the retroreflected laser radiation with a distance meter; and calculating three positional and three orientational degrees of freedom of the remote retroreflective target.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute apart of this specification, illustrate embodiments of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

The present invention may be implemented as a laser-based coordinate measurement machine, laser tracker, or other suitable system. The present inventon provides a new type of beam-steering mechanism; the ability to measure six degrees of freedom rather than just three degrees of freedom; and the ability to locate a plurality of retroreflector targets over a relatively wide field of view.

The invention does not require beam-steering optics because the laser light is routed through the laser tracker with optical fibers rather than with beam-steering mirrors or prisms. Laser light is processed, detected, and analyzed by optical and electrical components located for the most part away from the rotating elements within the tracker. One advantage of this approach is that it reduces the size and cost of the laser tracker system. Another advantage is that it improves accuracy and stability of the laser tracker system. The architecture is flexible enough to allow any number of laser beams to be launched without the use of optical beam-steering components.

The invention also provides the laser tracker with the ability to measure the six degrees of freedom of a target object which, in an exemplary embodiment, may be a cube-corner retroreflector. A hidden-point probe (capable of measuring points that are obscured from view) can be formed by attaching the target object to one end of a shaft and a probe tip to the other end of the shaft. The target object may also be attached directly to a machine tool or to the end-effector of a robot to more precisely control the movement of the tool or robot.

The invention also provides the laser tracker with the ability to determine the location of a plurality of retroreflector targets over a relatively large volume surrounding the tracker. To activate the target-locator feature of the tracker, the rotating portion of the tracker is turned to bring a ring of LED's surrounding a lens and photosensitive array to face the retroreflector targets. Flashes of light from the LED's travel to the retroreflectors then return to the tracker, where they pass through the lens onto the photosensitive array. The locations of the spots on the array indicate the angular directions of the targets.

Because the invention has the capability of launching multiple laser beams of different types, several modes of distance measurement are possible. One mode of distance measurement uses a laser beam that tracks a retroreflector to indicate either absolute or incremental distance. Another mode of distance measurement uses a laser beam to scan a diffuse surface. Either or both modes of distance measurement may be included in a given coordinate-measuring device.

Figure 1:
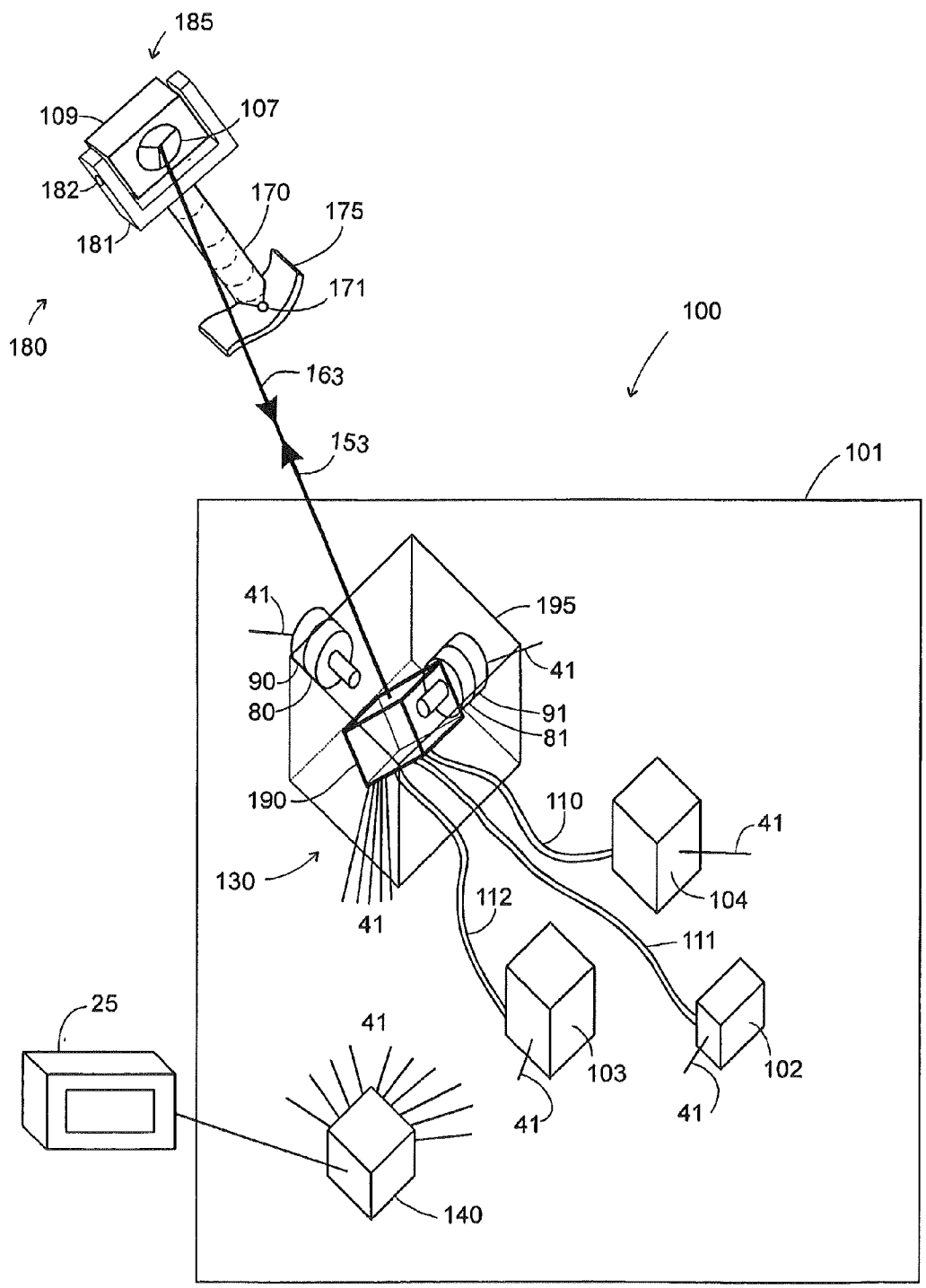
FIG. 1 depicts an embodiment of a laser tracker according to the present invention with a beam-steering mechanism and six degree-of-freedom measurement capability.

FIG. 1 shows a perspective, block-diagram view of a laser tracking system according to an embodiment of the invention. The laser tracking system comprises a laser tracker 100 and a probe assembly 180. The probe assembly comprises target object 185, adjustable stage 181, probe shaft 170, and probe tip 171. The target object 185 comprises retroreflector 107 and housing 109 comprise target object 185. Laser tracker 100 emits a laser beam 153 toward cube-corner retroreflector 107 mounted on housing 109. Housing 109 is attached to adjustable stage 181 that is designed to pivot about axis 182 and lock into place. Adjustable stage 181 is attached to probe shaft 170, which is attached on the opposing end to probe tip 171. Probe tip 171 is held in contact with the object 175 under evaluation. With the combination of laser tracker 100, computer 25, and probe assembly 180, it is possible to measure the coordinates of the object 175 under evaluation, even if object 175 is not directly accessible to the laser beam emitted from the tracker.

Figure 3:
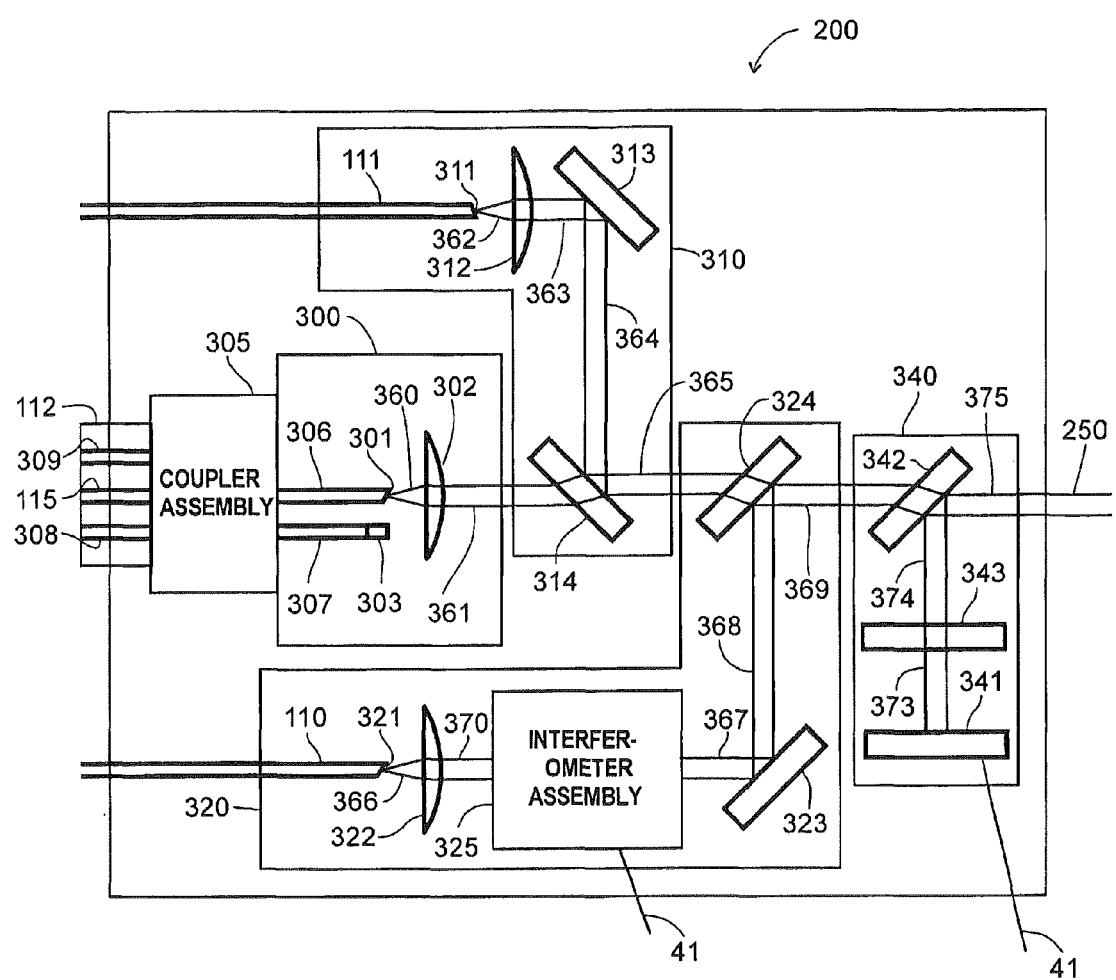
FIG. 3 depicts in block form components of the beam combiner of FIG. 2.

The configuration of the laser tracker of FIG. 1 will now be described. Laser 102 on stationary base 101 of the laser tracker 100 injects laser light (at least essentially coherent light having one wavelength) into a first end of an optical fiber 111. The laser of the absolute-distance meter (ADM) 103 injects laser light into a first end of an optical fiber 115 (as shown in FIG. 3) that is contained within optical fiber assembly 112. Laser 104 injects laser light into a first end of an optical fiber 110. These optical fibers are routed to rigid structure 190, at which location laser light is launched out of the second end of optical fibers 110, 111, 115 (as shown in FIG. 3). If desired, the combined laser light may be conditioned by optical elements within rigid structure 190 and emitted from rigid structure 190 as laser beam 153. Laser light 153 travels to retroreflector 107, where it is reflected parallel to laser beam 153. If laser beam 153 is centered on the vertex of the cube-corner retroreflector, then laser beam 163 will coincide with laser beam 153. That is, laser beam 163 will retrace the path of laser beam 153. The laser beam 163 enters rigid structure 190, where it is conditioned, if desired, and injected back into optical fibers 110, 111, and/or 115, or otherwise detected and processed as explained below. Rigid structure 190 is rotated by motor 81 with the angle of rotation indicated by angular encoder 91. Steering platform 195 includes rigid structure 190 and the elements mounted thereto, i.e., motor 81 and angular encoder 91. Steering platform 195 is turned on base 101 by motor 80, with the angle of rotation indicated by angular encoder 90. Rigid structure 190 is therefore supported for rotation about two orthogonal axes on base 101.

ADM 103 measures the absolute distance from laser tracker 100 to retroreflector 107. This device is capable of measuring the distance to retroreflector 107 in a single shot. Consequently, it can be used to perform rapid point-and-shoot measurements of multiple retroreflector targets. Laser 104 is used in conjunction with optical and electrical elements to measure the incremental distance moved by retroreflector 107. An example of a device that measures incremental-distance movement is the laser interferometer which measures the number of interference fringes that occur as the retroreflector is moved from a starting position. In a laser interferometer, if an obstruction is placed in the path of the interferometer's laser beam, all displacement information will be lost. In this circumstance, if a laser-tracker system has only an incremental-distance measurement system and not an absolute-distance measurement system, then the retroreflector must be returned to a reference position and the measurement started anew. Laser 102 is a stand-alone laser and will be discussed in more detail with reference to fiber launch assembly 310 of FIG. 3. Any number of laser beams may be sent over optical fibers into rigid structure 190.

Electronics box 140 provides electrical power to motors 80 and 81, angular encoders 90 and 91, lasers 102 and 104, ADM 103, as well as other electrical components within rigid structure 190. Electronics box 140 analyzes signals from angular encoders 90 and 91, from ADM 103, and from other electrical components to calculate angles and distances from tracker 100 to retroreflector 107. Electronics box 140 is attached to computer 25, which provides application software for the advanced analysis of coordinate data.

Figure 2:
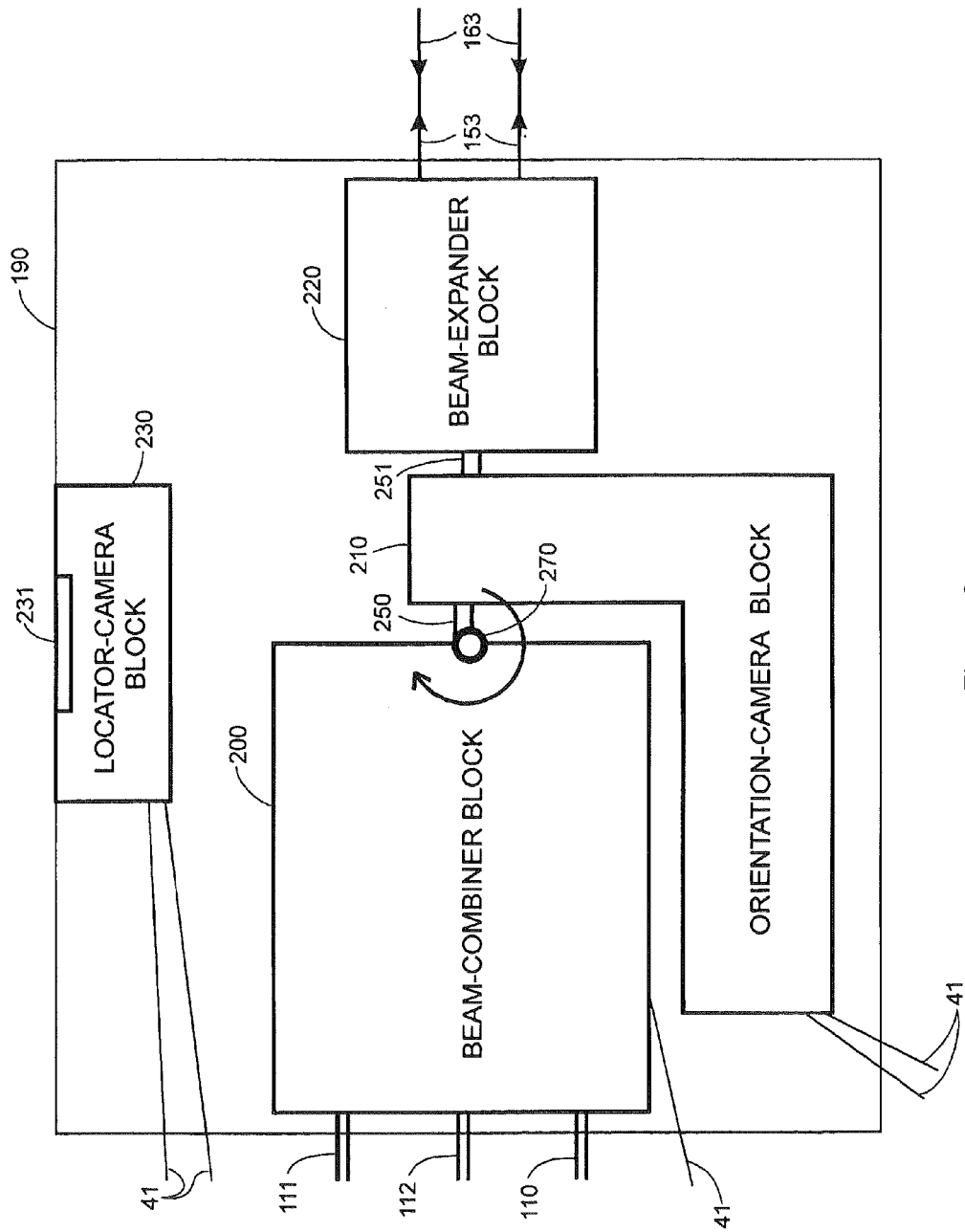
FIG. 2 depicts in block form the major components of a rigid structure of the laser tracker of FIG. 1.

The preferred optical elements within rigid structure 190 are shown in block diagram form in FIG. 2. The main functional blocks within rigid structure 190 include beam-combiner block 200, orientation-camera block 210, beam-expander block 220, and locator-camera block 230.

The optical fiber assemblies 110, 111, 112, etc. are routed into beam-combiner block 200, which combines the laser beams and sends them out as a single composite laser beam 250 that includes coherent light at a plurality of separate, discrete wavelengths. The composite laser beam 250 passes through orientation-camera block 210 to become laser beam 251. Laser beam 251 is beam expanded by beam-expander block 220, thereby exiting rigid structure 190 as expanded laser beam 153. The laser beam 153 travels to retroreflector 107 as shown in FIG. 1 and returns as laser beam 163. The laser beam 163 retraces the path of the outgoing laser beams 153, 251, 250 back through beam-expander block 220 and orientation-camera block 210 into beam-combiner block 200. Electrical lines 41 provide power from electronics box 140 to mechanical and electro-optical devices. Electrical lines 41 also route electrical signals from electro-optical devices to electronics box 140 for analysis. Rigid structure 190 rotates around the center of shaft 270 which is attached to motor 81 as shown in FIG. 1. In a typical mode of operation, motor 81 rotates rigid structure 190 so that laser beam 153 points toward retroreflector 107, thereby causing laser beam 163 to retrace the path of laser beam 153. In another mode of operation, motor 81 rotates rigid structure 190 until aperture 231 of locator camera 230 is aimed in the general direction of one or more retroreflectors in the surrounding environment. Locator camera 230 determines the approximate location of the retroreflector targets within a wide field of view.

Beam-Combiner Block

FIG. 3 shows diagrammatically the optical and electro-optical components within a preferred beam-combiner block 200. The main assemblies within beam-combiner block 200 are first laser-beam fiber launch and pickup assembly 300, second laser-beam fiber launch and pickup assembly 320, laser-beam fiber launch assembly 310, and position-detector assembly 340.

First laser-beam fiber launch and pickup assembly 300 receives light an end of optical fiber 115 which is attached at its opposing end to a laser in the laser and ADM 103 shown in FIG. 1. Laser light (at least one essentially coherent light at a first discrete frequency) travels in optical fiber 115 until it reaches coupler assembly 305. Part of the laser light emerging from coupler assembly 305 is in optical fiber 306. It travels to fiber termination 301, at which point it diverges as cone of light 360. Lens 302 collimates this light as laser beam 361 which passes through beam splitter 314 to become laser beam 365. Another part of the laser light emerging from coupler assembly 305 travels through an optical fiber 307 to fiber retroreflector 303 and returns through optical fiber 307 into coupler assembly 305 thereby forming a reference path as will be discussed with reference to FIG. 4.

Laser-beam fiber launch assembly 310 receives light from an end of optical fiber 111 which is attached at its opposing end to laser 102 shown in FIG. 1. Laser light travels in optical fiber 111 until it reaches fiber termination 311 where it diverges as cone of light 362. Lens 312 collimates the light as laser beam 363 which then reflects off mirror 313 to become laser beam 364. Laser beam 364 reflects off beam splitter 314 to join laser beam 365 from first laser-beam fiber launch and pick-up assembly 300. Laser beam 365 passes through beam splitter 324 to become laser beam 369.

Second fiber launch and pickup assembly 320 receives light from an end of optical fiber 110 which is attached at its opposing end to laser 104 shown in FIG. 1. Laser light travels in polarization-maintaining (PM) optical fiber 110 until it reaches fiber termination 321 where it diverges as cone of light 366. Lens 322 collimates the laser light as laser beam 370. Laser beam 370 passes into interferometer assembly 325 and emerges as laser beam 367. The laser beam reflects off mirror 323 as laser beam 368 and off beam splitter 324 as a part of laser beam 369. Laser beam 369 passes through beam splitter 342 to become laser beam 250.

FIG. 2 shows that laser beam 250 passes out of beam-combiner block 200 and continues through the rest of the elements in rigid structure 190, then travels as laser beam 153 to retroreflector 107 of FIG. 1 and returns as laser beam 163 to rigid structure 190. The laser light of beam 163 retraces the path of laser beams 251, 250 through the optical elements 220, 210 within rigid structure 190. As shown in FIG. 3, when the returning laser beam enters beam-combiner block 200, some of the returning light reflects off beam splitter 342 as laser beam 374. Beam splitter 342 reflects a portion of all of the wavelengths of laser light within laser beam 250. Optical filter 343 blocks all but one wavelength of the light within laser beam 374, which it transmits as laser beam 373. Position detector 341 is aligned so that laser beam 373 strikes the center of position detector 341 when laser beam 153 of FIG. 1 is centered on retroreflector 107. If laser beam 373 does not strike the center of position detector 341, an error signal is generated at detector 341, thereby causing motors 80 and 81 to turn rigid structure 190 to center laser beam 153 on retroreflector 107. In this way, position detector 341 enables the outgoing laser beam 153 of FIG. 1 to automatically track a moving retroreflector 107. Position detector 341 can be any device capable of giving an electrical signal in response to the position of light on a two-dimensional surface. Such a device may include, but is not limited to, a quadrant detector, a lateral-effect detector, a charge-coupled-device (CCD) array, a charge-injection-device (CID) array, or a complementary-metal-oxide-semiconductor (CMOS) array.

The number of laser beams launched out of beam-combiner block 200 can be increased or decreased as desired by adding more or fewer beam splitters within beam-combiner block 200. One way to combine and separate different types of laser beams is on the basis of wavelength. A dichroic beam splitter is a type of beam splitter that can pass particular wavelengths while reflecting other wavelengths. In a specific implementation using dichroic beam splitters, optical fiber 115 may emit laser light at a wavelength of 1550 nm, optical fiber 111 may emit laser light at 690 nm, and optical fiber 110 may emit laser light at 633 nm. Thus, beam splitters 314 and 324 may be dichroic beam splitters with the following characteristics. Beam splitter 314 transmits laser wavelengths longer than 1400 nm, but reflects wavelengths shorter than 1400 nm. Beam splitter 324 transmits wavelengths longer than 660 nm, but reflects wavelengths shorter than 660 nm. In this way, the laser beams are combined as they pass through beam-combiner block 200 on the way out of rigid structure 190. Similarly, the laser beams are separated on the reverse path through beam-combiner block 200. Combining and separating the wavelengths with dichroic beam splitters reduces the interaction among the laser beams, thereby preventing measurement errors. Furthermore, the use of dichroic beam splitters reduces power loss that would result from the use of wavelength-insensitive beam splitters.

The laser beam sent out of fiber launch assembly 310 may serve a number of purposes. In the specific example shown in FIGS. 1 and 3, the laser beam launched from second laser-beam fiber launch and pickup assembly 320 is red (633 nm), thereby providing a visible indication of the direction to which the laser beam is pointing. In the event that the laser beam from second laser-beam fiber launch and pickup assembly 320 is turned off or, not visible, is otherwise not available, the laser beam emitted by laser-beam fiber launch assembly 310 can serve as a visible pointer beam to assist the operator in locating retroreflector targets with the tracker. This same laser beam may be used as a part of a complex system for other purposes such as determining the orientation of a retroreflector target. There are occasions in which it is very useful to have the laser tracker emit multiple laser beams. As noted above, the flexible architecture of the invention allows as few or as many laser beams as desired to be launched.

Figure 4:
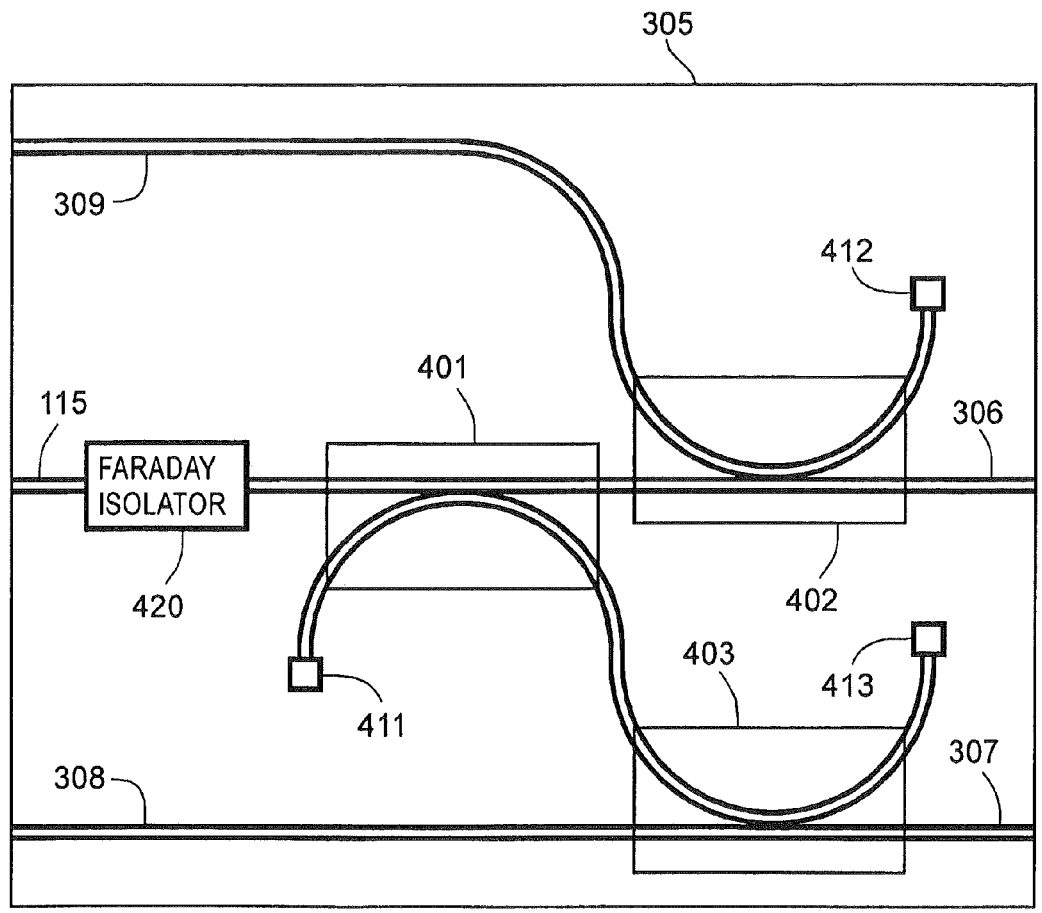
FIG. 4 depicts the components of the coupler assembly of FIG. 3.

FIG. 4 shows a detailed view of the coupler assembly 305. Laser light enters coupler assembly 305 on optical fiber 115 and travels to Faraday isolator 420 which allows light to travel in only one direction. Faraday isolator 420 is included to prevent back-reflected laser light from entering and destabilizing the laser found in the ADM 103. The laser light passes through Faraday isolator 420 and enters optical coupler 401 which, in an exemplary configuration, sends 85% of the optical power to optical coupler 402 and 15% of the optical power to optical coupler 403. Of the optical power entering coupler 402, a portion such as one half is sent to low-reflectance termination 412 and the remaining half travels to optical fiber 306. As shown in FIGS. 1 and 3, the laser light in optical fiber 306 is launched from the fiber and travels to retroreflector 107. The light from the retroreflector retraces its path through the laser tracker and re-enters optical fiber 306. When light is received via optical coupler 402, half of the optical power is sent to the Faraday isolator 402 where it is blocked. The remainder is sent to optical fiber 309 and continues to ADM 103 via optical fiber assembly 112. Of the optical power that is sent from optical coupler 401 to optical coupler 403, half travels to low-reflectance termination 413, and the other half travels along optical fiber 307 to fiber retroreflector 303. The light retraces its path back along optical fiber 307 into coupler 403. Half of the optical power is sent to coupler 401 where it is sent in equal parts to the low-reflectance termination 411 and the Faraday isolator 420. The other half of the optical power is sent into optical fiber 308 and continues to ADM 103 via optical fiber assembly 112.

The optical couplers shown in FIG. 4 split light into two paths in the forward direction and two paths in the reverse direction. A low-reflectance termination is used to absorb the light in one of the four possible paths (two forward paths plus two reverse paths). Another term for a possible path is a "port," so the couplers shown in FIG. 4 are examples of four-port couplers having a low-reflectance termination on one of the four ports. An alternative to the type of coupler shown in FIG. 4 is the optical circulator, which has three ports, rather than four, ports. In other words, in an optical circulator, the laser light travels along one optical-fiber path in the forward direction and branches to a different optical fiber path in the reverse direction. For the purposes of this invention, the term optical coupler is used to encompass both four-port and three-port light splitting devices. In other words, a term fiber-optic coupler (or simply coupler) is understood to include any type of device that splits light in an optical fiber and therefore can be either a four-port coupler or a three-port circulator.

For absolute-distance measurement, two paths are used: a measurement path and a reference path. Both paths begin at the laser of the ADM 103 and include the optical fiber 115 and the Faraday isolator 420. In the measurement path, the laser light travels through optical fiber 306, through rigid structure 190, to the retroreflector 107 and back, into fibers 306 and 309, and then into a measurement detector (not shown) in the ADM 103. In the reference path, the laser light travels through optical fiber 307, to the fiber retroreflector 303 and back, into fibers 307 and 308, and then into a reference detector (not shown) in the ADM 103. The optical fibers 308 and 309 are in the reference and measurement channels, respectively, and are matched in length. They are routed in close proximity to one another so that the local temperatures experienced by each are nearly equal. This commonality of length and temperature has the effect of minimizing the errors caused by temperature-induced changes in the index of refraction of the optical fibers. Without this commonality, a changing temperature might be mistaken for a changing distance to the retroreflector.

Many types of ADM are compatible with the fiber delivery beam-steering mechanism depicted in FIG. 1. While any suitable type of ADM can be employed, an exemplary type of ADM operates by measuring the phase shift of laser light that is intensity modulated by a sine wave. Thus, the particular type of laser might be a distributed feedback (DFB) semiconductor laser whose optical power is modulated by the direct application of a radio-frequency (RF) electrical signal at a single (sinusoidal) frequency of 3 GHz. For any given distance to the retroreflector 107, there will be a corresponding difference in the phase of the reference and measurement channels. If a is a constant, f is the frequency of modulation (3 GHz), c is the speed of light ($\cong 3\times 10^8$ m/s), n is the group index of refraction of the air through which the laser light travels ($\cong 1$), m is an integer, and $\phi$ is the phase difference measured by the ADM, then the distance d from laser tracker 100 to retroreflector 107 is given by the following formula:

$$d = a + \frac{c}{2fn}\left(m + \frac{\phi}{2\pi}\right). \tag{1}$$

The constant a sets the distance scale so that a distance of zero is set at the pivot point through which the laser beam appears to emanate as the laser tracker is turned to different angles. The pivot point is located approximately at the intersection of the laser beam and the center of shaft 270. The integer m is equal to the number of complete multiples of $2\pi$ radians in the phase difference (measurement phase minus reference phase) measured by the ADM. For example, if the frequency of modulation f is 3 GHz, then from Eq. (1) the distance corresponding to a phase difference of $2\pi$ radians is approximately $3\times 10^8/2(3\times 10^9)(1)$ m=0.05 m. This distance is sometimes referred to as the unambiguous range. If the distance d–a is 1.22 meters, then the number of complete multiples of $2\pi$ radians in the phase difference is int(1.22/0.05)=24 and the residual phase shift is approximately $\phi \cong 2\pi(1.22-0.05\cdot 24)/0.05=0.8\pi$ radians. The most convenient way to determine the integer m is to temporarily reduce the frequency f to a value that is small enough to cover the entire range of interest, but with an accuracy that is large enough to determine the value of m. For example, suppose that the frequency is temporarily reduced to 2.5 MHz. In this case, the unambiguous range is $3\times 10^8/2(2.5\times 10^6)(1)$ m=60 m. If the accuracy of the phase measurement is one part in $10^5$, then the position of retroreflector 107 is known to an accuracy of $60\cdot 10^{-5}$ m=0.6 mm at any distance up to 60 meters from the tracker. This value is much smaller than the unambiguous range of 50 mm for the higher modulation frequency of 3 GHz. This means that a single measurement of phase difference with the lower modulation frequency is sufficient to determine the integer m in Eq. (1). This technique of reducing the frequency to determine the value of m is of greatest value if it is needed only at the start of a measurement or after the laser beam has stopped tracking the retroreflector 107. For this to be the case, the phase measurements must be taken rapidly enough to ensure that the retroreflector has not moved over a complete unambiguous range between measurements. For example, if measurements are made 1000 times per second, then the radial speed must not exceed (0.05)(1000)/2=25 meters per second. The human arm is not capable of moving a retroreflector target at a radial speed of greater than about 4 meters per second, so this technique of determining m is feasible under the conditions given above.

The modulated laser light that travels on optical fibers 308 and 309 within optical fiber assembly 112 arrives at optical detectors located within ADM 103. These optical detectors convert the laser light to electrical signals. For the particular type of ADM described above, electrical components within ADM 103 process the electrical signal to determine the phase of the signal for the measurement and reference paths.

Figure 5:
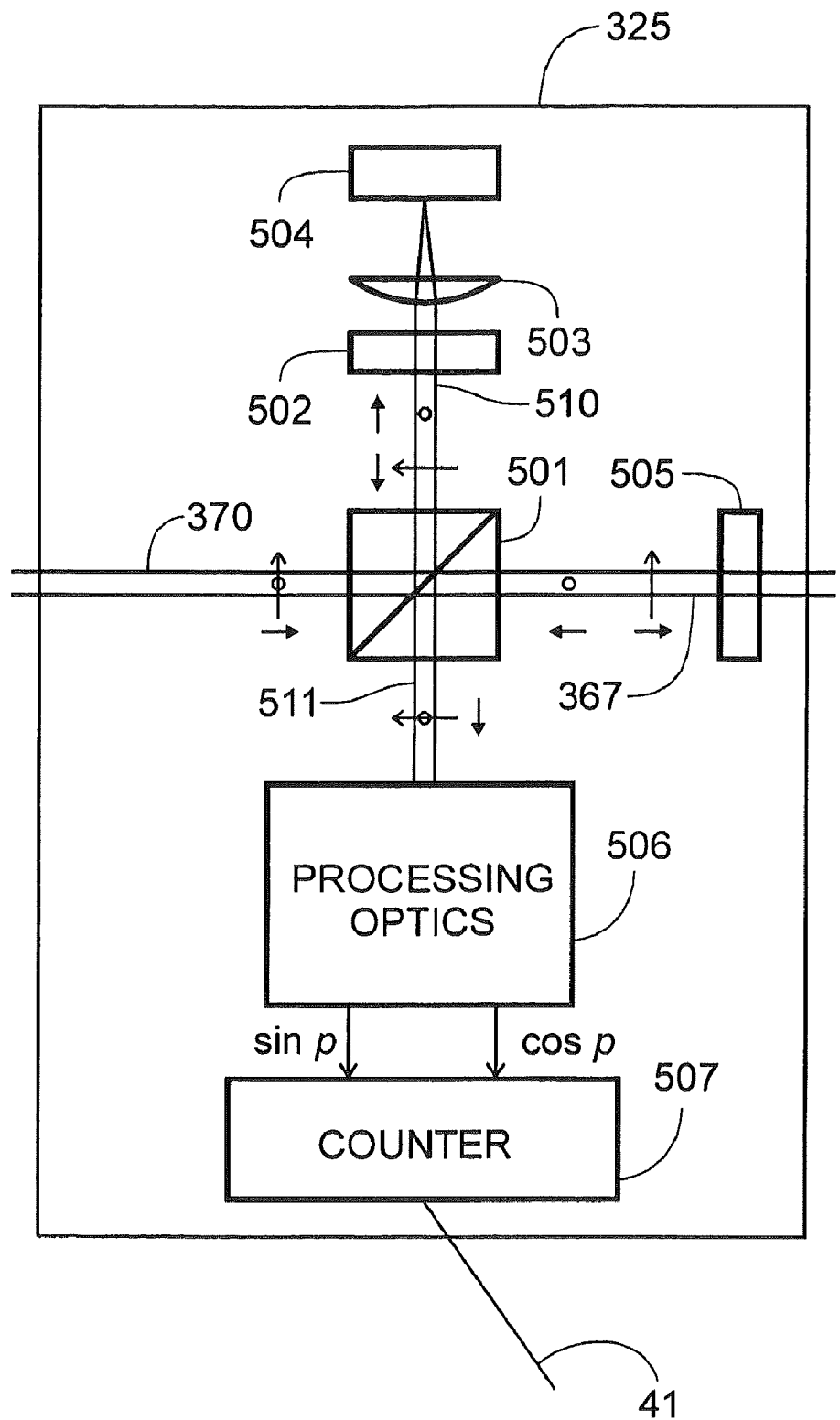
FIG. 5 depicts the components of the interferometer assembly of FIG. 3.

As shown in FIG. 3, laser light that is launched from optical fiber 110 is collimated by lens 322 to become laser beam 370. This laser beam travels to interferometer assembly 325, a detailed view of which is shown in FIG. 5. The laser light of beam 370 is linearly polarized at 45 degrees to the plane of the paper in FIG. 5. In other words, half of the laser light is polarized in the plane of the paper and half of the light is polarized perpendicular to the plane of the paper, with both polarizations having the same phase. The arrow that is perpendicular to laser beam 370 in FIG. 5 represents the laser light that is polarized in the plane. The small circle that is centered on laser beam 370 in FIG. 5 represents the laser light that is polarized perpendicular to the plane of the paper. Laser beam 370 travels to polarizing beam splitter 501. The portion of laser beam 370 that is polarized perpendicular to the plane of the paper in FIG. 5 reflects off polarizing beam splitter 501 to become laser beam 510. The light travels to quarter waveplate 502 having a fast axis oriented at 45 degrees to the plane of the paper in FIG. 5. The waveplate converts the polarization state of laser beam 510 from linear to circular. Lens 503 focuses the light onto mirror 504, which retroreflects the laser beam 510 back on itself. Alternatively, a retroreflector (such as a cube-corner retroreflector) may be substituted for lens 503 and mirror 504. Lens 503 collimates the retroreflected light, sending it back through quarter waveplate 502, changing the polarization state of the light from circular to linear, with the direction of the linearly polarized light now in the plane of the paper. This light, which is now p-polarized with respect to the polarizing beam splitter 501, passes through the beam splitter to become part of laser beam 511. That portion of laser beam 370 that is in the plane of the paper in FIG. 5 travels straight through polarizing beam splitter 501 to become laser beam 367. This light passes through quarter waveplate 367, whose fast axis is oriented at 45 degrees with respect to the plane of the paper. When laser beam 367 passes through the waveplate, its polarization state changes from linear to circular. The resulting laser beam travels through the optical elements in rigid structure 190, travels to retroreflector 107, and travels back through the optical elements in rigid structure 190 to arrive at quarter waveplate 505. As laser beam 367 travels in the reverse direction through quarter waveplate 505, its polarization state changes from circular to linear, with the direction of the linearly polarized laser light now in perpendicular to the plane of the paper in FIG. 5. (As an alternative to placing quarter waveplate 505 inside interferometer assembly 325, the waveplate may be placed at some later point along the path of the laser beam.) Laser beam 367, which is now s-polarized with respect to polarizing beam splitter 501, reflects off the beam splitter to become part of laser beam 511. Laser beam 511 comprises of two portions: a reference portion that is polarized in the plane of the paper and a measurement portion that is polarized perpendicular to the plane of the paper. As the retroreflector 107 is moved in a radial direction with respect to laser tracker 100, the phase difference between these two linearly polarized components will vary. There will be a phase change of $2\pi$ radians for each change of one-half wavelength in the radial distance to the retroreflector. Here, the wavelength is that of the laser light in laser beam 370 as seen in the local medium (air) through which the laser light travels. Laser beam 511 travels to processing optics 506, which uses optical elements such as beamsplitters, waveplates, and optical detectors to provide two electrical signals. One electrical signal is proportional to cos p, and the other electrical signal is proportional to sin p, where p is the phase difference between the two linearly polarized portions of laser beam 511. The electrical signals are sent to a counter circuit 507 that counts the number of half wavelengths traveled by retroreflector 107. The product of the wavelength of the light and the number of wavelengths traveled gives the total displacement of retroreflector 107 relative to some starting position. Counter 507 sends electrical signals over electrical line 41 to electronics box 140 for conversion from counts to a radial distance. If laser beam 153 is obstructed from reaching retroreflector 107, even for a moment, then information on the correct number of counts is lost, and the measurement must be started anew from some reference position whose distance to the tracker has been previously established. The type of interferometer shown in FIG. 5 is known as a homodyne interferometer because the reference portion and measurement portion that are combined to form laser beam 511 are both at the same wavelength. Alternatively, a heterodyne interferometer in which two different laser wavelengths are mixed together prior to optical detection or other suitable system could be used.

Beam-Expander Block

Figure 6:
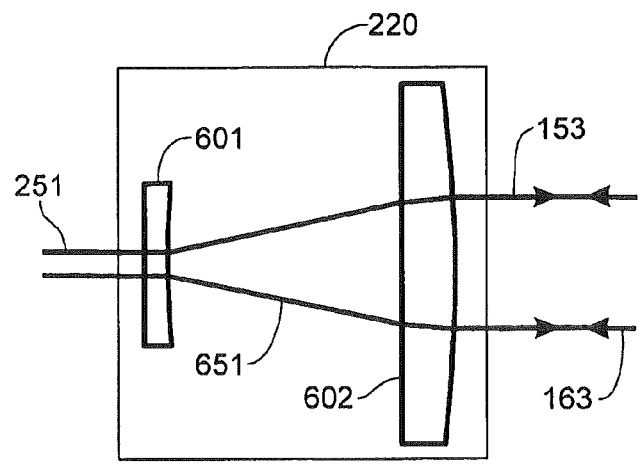
FIG. 6 depicts in block form components of the beam expander of FIG. 2.

The optical components within beam-expander block 220 of FIG. 2 are shown in FIG. 6. The beam-expander block 220 expands the laser beam as it travels in the forward direction and to contract the laser beam as it travels in the reverse direction. Lens 601 converts collimated laser beam 251 into cone of light 651. Lens 602 converts cone of light 651 into collimated laser beam 153.

The reason for expanding the laser beam before it leaves rigid structure 190 is to reduce the divergence of the laser beam during propagation. This makes it possible to place retroreflector 107 farther from laser tracker 100 than would otherwise be the case. Alternatively, the beam-expander block 220 could be eliminated by increasing the distance in FIG. 3 between the fiber terminations 301, 311, and 321 and the corresponding lenses 302, 312, and 322 while increasing the focal lengths of lenses 302,312, and 322 by a corresponding amount. Accordingly, the diameters of laser beams 361, 363, and 370 would be increased, thereby eliminating the need for beam-expander block 220. The disadvantage of this approach is that it requires that many optical elements (lenses, mirrors, beam expanders, and position detector) be made larger to accommodate the larger beam diameters. By adding beam-expander block 220, the overall size of beam-combiner block 200 is reduced.

Orientation-Camera Block

Figure 7:
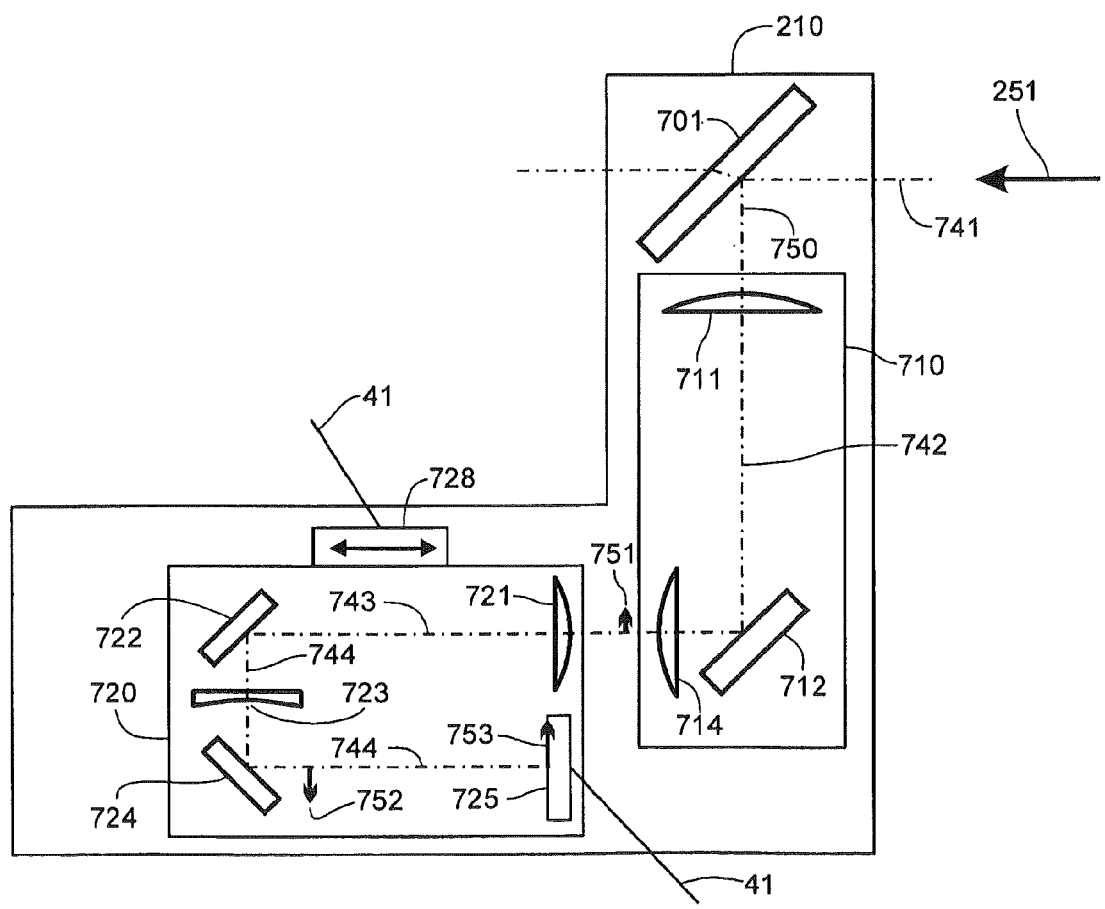
FIG. 7 depicts in block form components of the orientation camera of FIG. 2 showing the locations of the intermediate and final images.

The main elements of orientation-camera block 210 of FIG. 2 are shown in FIG. 7. On the return path from retroreflector 107, laser beam 251 travels along optical axis 741. Beam splitter 701 reflects a portion of the beam to a path along optical-axis segments 750, 742, 743, and 744. Eventually, this reflected light arrives at photosensitive array 753. The complete lens system, which comprises the beam-expander block 220, afocal lens block 710, and relay lenses, 721 and 723, produces an image on the photosensitive array of the pattern of light in the vicinity of the vertex of retroreflector 107. The beam-expander block 220 and the afocal lens block 710 work together to produce a first intermediate image 751 of this pattern of light. The location of first intermediate image 751 will depend on the distance of retroreflector 107 from the laser tracker. Motorized stage 728 is activated to move lens 721 to an appropriate distance from first intermediate image 751. Lens 721 forms second intermediate image 752 located past negative lens 723 but inside the back focal point of negative lens 723. Negative lens 723 converts the second intermediate image into a real image 753 on photosensitive array 725.

The orientation-camera block 210 allows the distance between the tracker and the retroreflector target to be large. For example, a distance of more than thirty meters is possible. The lens systems of the orientation-camera block 210 and beam-expander block 220 have two main functions. First, a magnification that is approximately constant is maintained so that the image will nearly fill the photosensitive array, thereby maintaining high accuracy for large and small distances alike. Second, the adverse effects of diffraction, which may result in lines or other features changing shape or direction during propagation over large distances, are minimized. To maintain constant magnification, afocal lens systems 220 and 710 are used. An afocal lens system is one that converts an incoming ray of light that is parallel to the optical axis into an outgoing ray of light that is also parallel to the optical axis. A succession of afocal lens systems, as represented by the combination of lens systems 220 and 710, has the property of constant magnification. In other words, the size of first intermediate image 751 is constant, regardless of the distance from retroreflector 107 to the tracker. If first intermediate image 751 is located between lenses 711 and 714, then it is not possible to place photosensitive array 725 at the location of this intermediate image. Relay lenses 721 and 723 eliminate this problem by converting first intermediate image 751 into image 753 on array 725. Motorized stage 728 places lens 721 an appropriate distance from first intermediate image 751. Knowledge of the distance to retroreflector 107, which is a quantity measured by the tracker, along with knowledge of the focal lengths and positions of the lens elements, is sufficient to determine the correct placement of lens 721. As is explained below, it is not necessary for the lens system to obtain an exactly prescribed magnification, so motorized stage 728 can be relatively inexpensive. The distance that motorized stage 728 must move will depend on the range of distances to be covered, as well as on the magnification of the lens system. Longitudinal magnification of a lens system varies in proportion to the square of the transverse magnification. As an example, suppose that a 12×12 millimeter area of target object 185 is imaged onto a photosensitive array having an area of 3×3 mm. The required (transverse) magnification for the system will then be $3/12=1/4$. This could be achieved by making the combined magnification of the afocal lens systems equal to $1/4$ and the combined magnification of the relay lenses 721 and 723 equal to 1. In this case, however, to cover distances of 1 to 33 meters from the tracker, it would be necessary for motorized stage 728 to have a range of movement of $(33-1) \text{ m}/4^2=2$ m. Such a large range of movement is impractical for most real systems. To solve this problem, the magnification of the afocal lens systems could be reduced, and the reduced magnification could be compensated with the relay lenses. For example, suppose that the afocal lens pairs have a combined magnification of $1/32$, while the relay lenses have a combined magnification of 8. In this case, the net magnification is still $1/4$, but the motorized stage 728 needs to have a range of movement of only $(33-1) \text{ m}/32^2=31.25$ mm.

The photosensitive array 725 can be any device capable of returning detailed electrical information about the pattern of light incident on the array. Exemplary photosensitive arrays include the charged-coupled-detector (CCD) array, the charge-injection-device (CID) array, and the complementary-metal-oxide-semiconductor (CMOS) array. Among these, CCD arrays have high performance and small size, but CMOS arrays are often capable of providing high-speed readout with simpler electrical circuitry. CMOS and CID arrays often have the advantageous feature of random-access readout of pixel data.

Figure 8A:
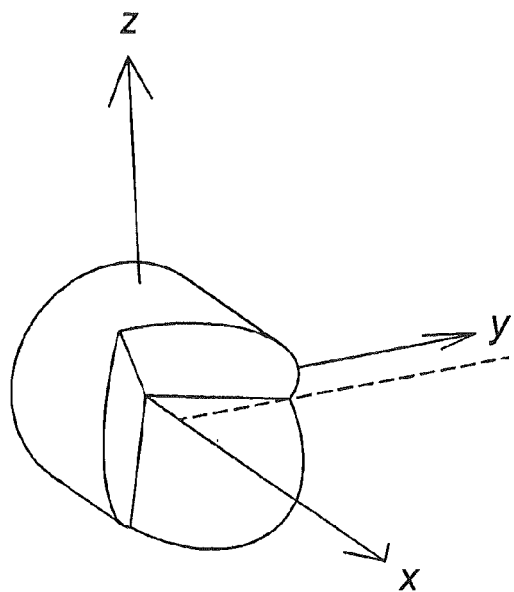
FIGS. 8a and 8b define the coordinate system for an unrotated cube-corner retroreflector.
Figure 8B:
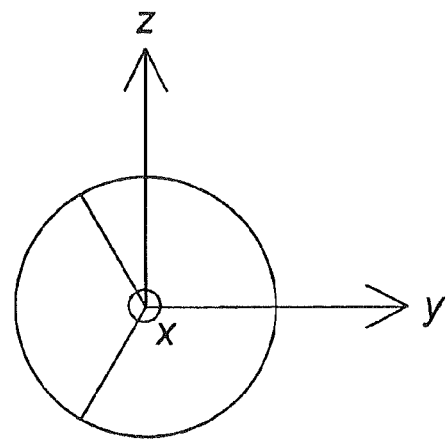
Figure 9A:
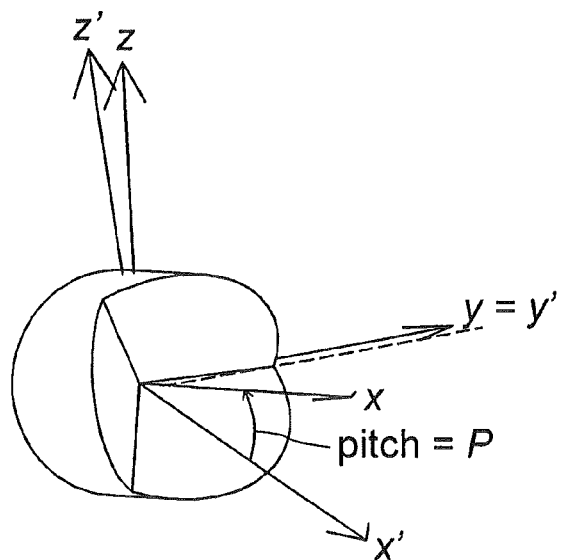
FIGS. 9a and 9b show the effect of pitch angle on the retroreflector.
Figure 9B:
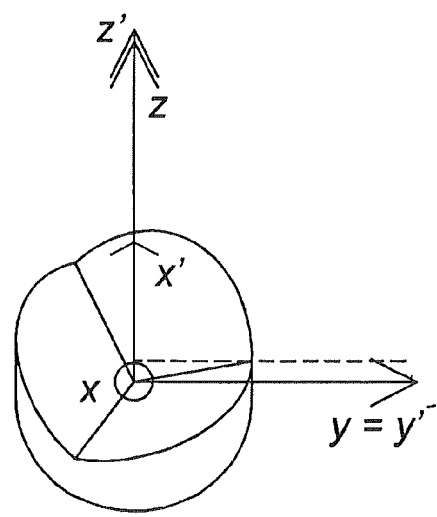
Figure 10A:
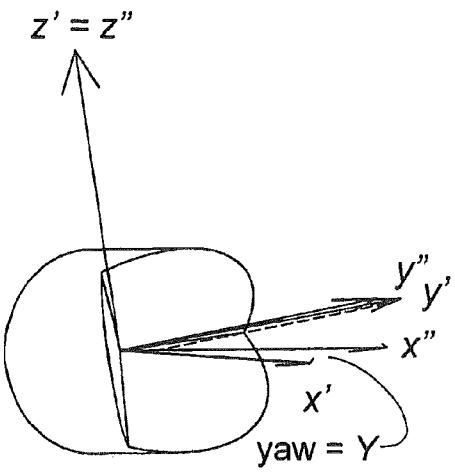
FIGS. 10a and 10b show the effect of yaw angle on the retroreflector.
Figure 10B:
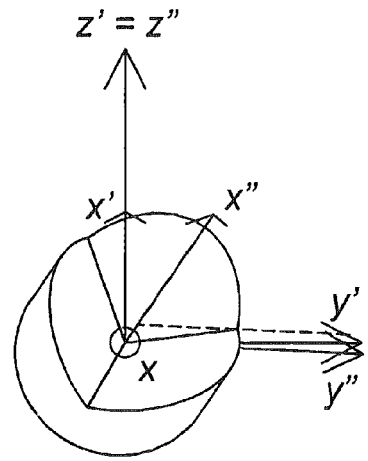
Figure 11A:
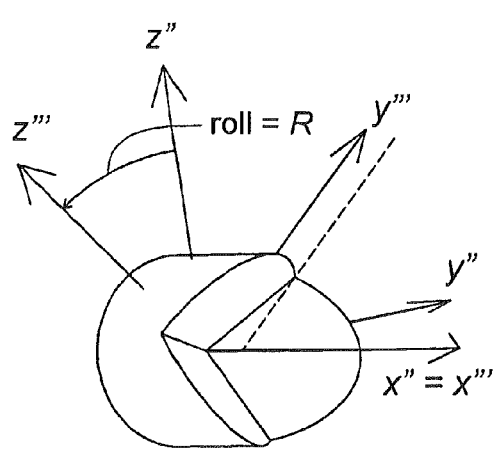
FIGS. 11a and 11b show the effect of roll angle on the retroreflector.
Figure 11B:
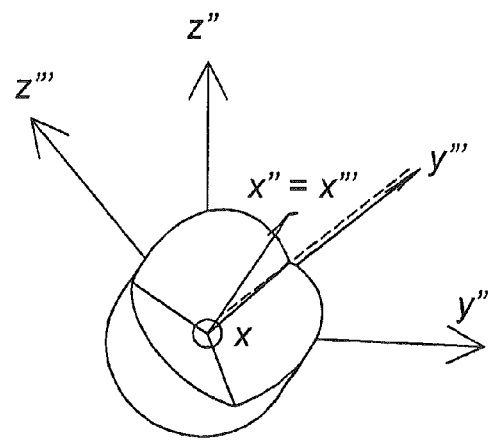

We will now discuss how the image on the orientation camera can be used to determine the pitch, yaw, and roll angles of retroreflector 107. FIGS. 8*a* and 8*b* show an unrotated cube-corner retroreflector. In other words, in FIGS. 8*a* and 8*b*, the roll angle is zero, the yaw angle is zero, and the pitch angle is zero. By definition, the x direction shown in FIGS. 8*a* and 8*b* is opposite the direction of the laser beam that is sent into the retroreflector. The three perpendicular reflecting surfaces of the cube-corner retroreflector form three lines of intersection. As shown in FIG. 8*a*, the x-y plane contains the x axis and one of the lines of intersection. The x-y plane also contains the y axis, which is perpendicular to the x axis and passes through the vertex of the cube corner. The dashed line in FIG. 8*a* is parallel to the y axis and has been included for clarity. In the front view of FIG. 8*b*, the y and z axes lie in the plane of the paper, while the x axis points out of the paper. FIGS. 9*a* and 9*b* show the effect of rotating the retroreflector about the −y axis by the pitch angle P, which is 15 degrees in this example. This rotation operation results in new coordinate system: x', y', z', with y=y'. FIGS. 10*a* and 10*b* show the effect of rotating the retroreflector about the z' axis by the yaw angle Y, which is 10 degrees in this example. This rotation results in a new coordinate system: x", y", z", with z"=z'. FIGS. 11*a* and 11*b* show the effect of rotating the retroreflector about the x" axis by the roll angle R, which is 40 degrees in this example. Note that in FIG. 11*b*, the x axis (direction opposite that of the laser beam) still points straight out of the paper. The roll, yaw, and pitch angles are found from a measurement of the three lines of intersection by the orientation camera 210. The camera detects the three lines of intersection of cube-corner retroreflector 107. The vertex of cube-corner retroreflector 107, which is defined as the common point of the three reflecting surfaces, remains centered on the photosensitive array 725 of FIG. 7. The electrical signals from photosensitive array 725 may be sent to a local digital-signal processing chip or sent over electrical wires 41 to electronics box 140 of FIG. 1. These electrical components determine the slopes of the three lines of intersection. By definition, the y and z axes on the surface of photosensitive array 725 point in the horizontal and vertical directions, respectively. The slope of the first (reference) line of intersection is defined as $m_1=\Delta z_1/\Delta y_1$, where $\Delta y_1$ and $\Delta z_1$ are the horizontal and vertical distances on the surface of photosensitive array 725 from the image of the cube-corner vertex to the image of an arbitrary point on the first line of intersection. The slopes of the second and third lines of intersection are defined in a similar manner as $m_2=\Delta z_2/\Delta y_2$ and $m_3=\Delta z_3/\Delta y_3$. The three unknown angles, the roll angle R, the yaw angle Y, and the pitch angle P, are found by simultaneously solving the following three equations:

$$m_1 = \frac{\sin P \cos Y / \sqrt{2} - \sin P \sin Y \cos R + \cos P \sin R}{\sin Y / \sqrt{2} + \cos Y \cos R}, \quad (2)$$

$$m_2 = \frac{\sin P \cos Y / \sqrt{2} - \sin P \sin Y \cos(R + 120°) + \cos P \sin(R + 120°)}{\sin Y / \sqrt{2} + \cos Y \cos(R + 120°)}, \quad (3)$$

-continued $$m_3 = \frac{\sin P\cos Y/\sqrt{2} - \sin P\sin Y\cos(R+240°) + \cos P\sin(R+240°)}{\sin Y/\sqrt{2} + \cos Y\cos(R+240°)} \quad (4)$$

For the example considered here in which R is 40 degrees, Y is 10 degrees, and P is 15 degrees, Eqs. (2)-(4) yield $m_1=0.874$, $m_2=0.689$, and $m_3=-2.651$. As a check of these results, the slope values can also be calculated directly from the y and z values of the lines of FIG. 11b. These calculations yield $m_1=0.7667/0.8772=0.874$, $m_2=0.5528/-0.8026=-0.689$, and $m_3=-0.7788/0.2938=-2.651$, which match exactly the results obtained from Eqs. (2)-(4).

The visibility of the lines on photosensitive array 725 of FIG. 7 may be improved by increasing the thickness of the lines of intersection of retroreflector 107 or by coating the lines with a non-reflective material. Thicker lines of intersection on retroreflector 107 will cause the images of the lines seen on the photosensitive array to have higher contrast. However, thicker lines of intersection on retroreflector 107 will not usually result in thicker image lines on photosensitive array 725. Usually, the thickness of the lines as seen on photosensitive array 725 is determined by the effects of diffraction of the laser light that passes through the clear aperture of laser tracker 100. The larger the clear aperture (the opening through which the light passes into the tracker), the smaller will be the deleterious effects of diffraction, which included broadening, smearing, and chopping of the image on photosensitive array 725. The deleterious effects of diffraction are also smaller when the retroreflector 107 is moved closer to the laser tracker 100. Fortunately, for the system considered here, the smearing effects of diffraction are symmetrical about the lines of intersection, so there is no bias in measuring the slopes of the lines.

Figure 12:
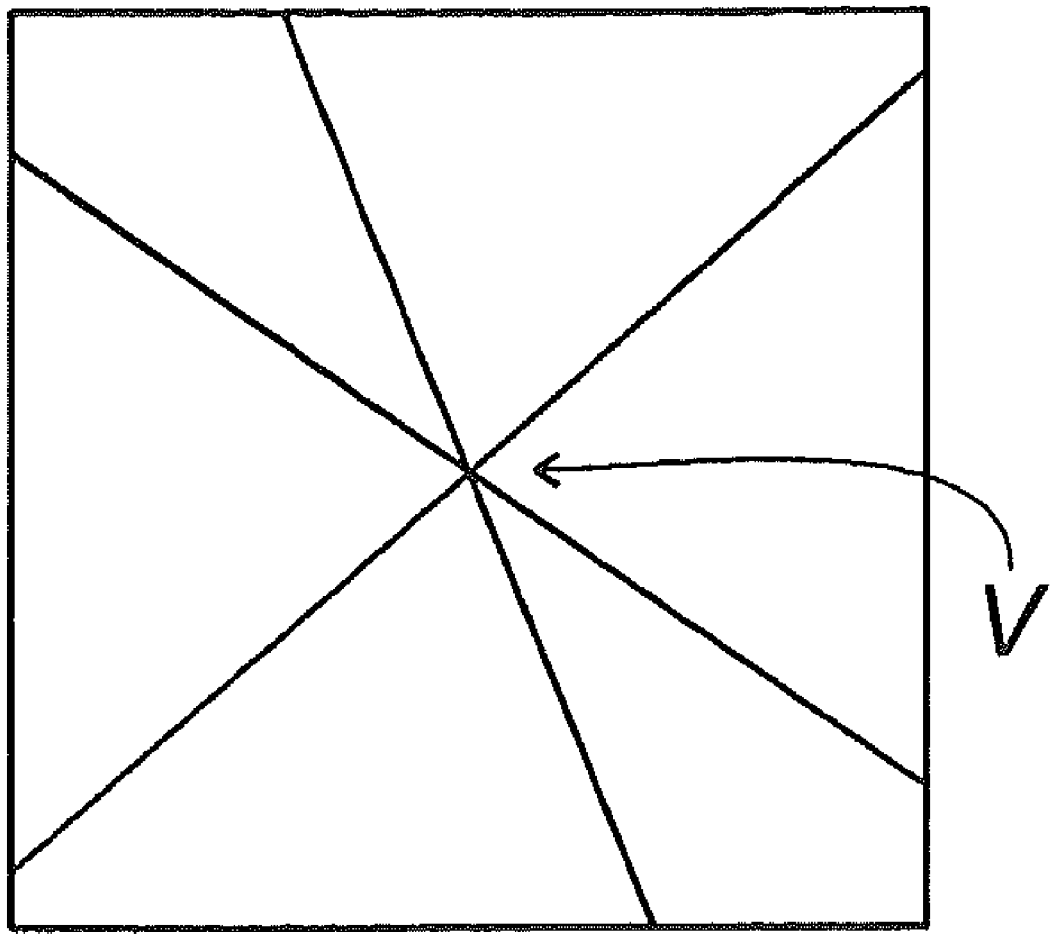
FIG. 12 illustrates the appearance of the image on the photosensitive array within the orientation camera.

The appearance of the lines on the image of photosensitive array is shown in FIG. 12. The lines on this image that pass through vertex V appear on both sides of the vertex. By comparison, FIG. 11b shows that the lines of intersection of the physical cube-corner retroreflector appear on only one side of the vertex. This difference is the result of the symmetry in the paths that light can take when the laser beam is centered on vertex V. For example, if a pencil of light reflects off mirror 1, then mirror 2, then mirror 3 of the cube corner, then another pencil of light can reflect off mirror 3, then mirror 2, then mirror 1. If, instead of striking a mirror, the pencil of light strikes a line of intersection, then the light will not reflect back to the tracker and a dark spot will appear on the image of photosensitive array 725. However, this dark spot would also appear if the light had traveled in the reverse direction before encountering the line of intersection. Hence light entering on either side of vertex V is blocked. It is impossible to tell from the image of the photosensitive array 725 alone which of the three line segments corresponds to which of the three lines of intersection of a cube-corner retroreflector. There are several ways around this problem. The simplest, but least convenient, method for assigning the lines of the image (FIG. 12) to the lines of intersection (FIG. 11b) is to have the operator indicate the approximate orientation of probe assembly 180 at the start of a measurement sequence. An approximate orientation is sufficient to determine which of the image line segments corresponds to each of the lines of intersection. Another simple but effective method is to temporarily turn off or reduce the power of the laser beam 153 emitted by laser tracker 100 and, at the same time, to increase the exposure time of photosensitive array 725. Under these conditions, the photosensitive array will ordinarily be able to make out the features of housing 109 and hence obtain information on the orientation of retroreflector 107. A third method for assigning the line segments to the corresponding lines of intersection is described in a second embodiment that is discussed later.

The method for determining the pitch, roll, and yaw angles as described above provides has two main advantages. First, an essentially constant-magnification camera maintains the accuracy of the measurement for a probe located either near the tracker or far from it. Second, elimination of spurious diffraction effects improves accuracy, which may otherwise change the angles of the lines or dramatically change the appearance of the lines, especially at large distances.

FIG. 1 shows that housing 109 can be pivoted about axis 182 mounted on adjustable stage 181 and then locked in place. This allows cube-corner retroreflector 107 to be oriented in any desired direction. This flexibility in the orientation of retroreflector 107 is desirable because it allows probe tip 171 to be placed in slots, holes, and so forth at any given angle. Preferably shaft 182 is aligned with the vertex of retroreflector 107 to simplify calculations to determine the location of probe tip 171. If the locking mechanism allows a limited number of angular adjustments, each known to a sufficient angular accuracy (perhaps a few arc seconds), then measurement may resume as soon as the lock down is complete. If the locking mechanism is not sufficiently precise, then an alternative approach involves adjusting housing 109 to any given orientation and performing a simple compensation routine to determine the angle between retroreflector 107 and probe shaft 170. Such a compensation routine might include measuring the location of a reference point with a spherically mounted retroreflector target and then measuring the same location with probe assembly 180 tilted to cover a range of pitch, yaw, and roll angles.

It is possible to replace the described cube-corner retroreflector 107, which is made of three reflecting mirrors, with a cube-corner retroreflector prism formed of solid glass. Each type of retroreflector has advantages. For example, the cube-corner retroreflector that uses mirrors (also known as a hollow-core cube-corner retroreflector) is more accurate because it is not prone to transverse and radial offset errors and because it has no glass/air interface to cause unwanted optical reflections. The solid glass cube-corner retroreflector has a wider field of view and is usually less expensive. Equations (2), (3), and (4) can be readily modified to account for a solid-glass, rather than a hollow-core, cube-corner retroreflector.

Locator-Camera Block

Figure 13:
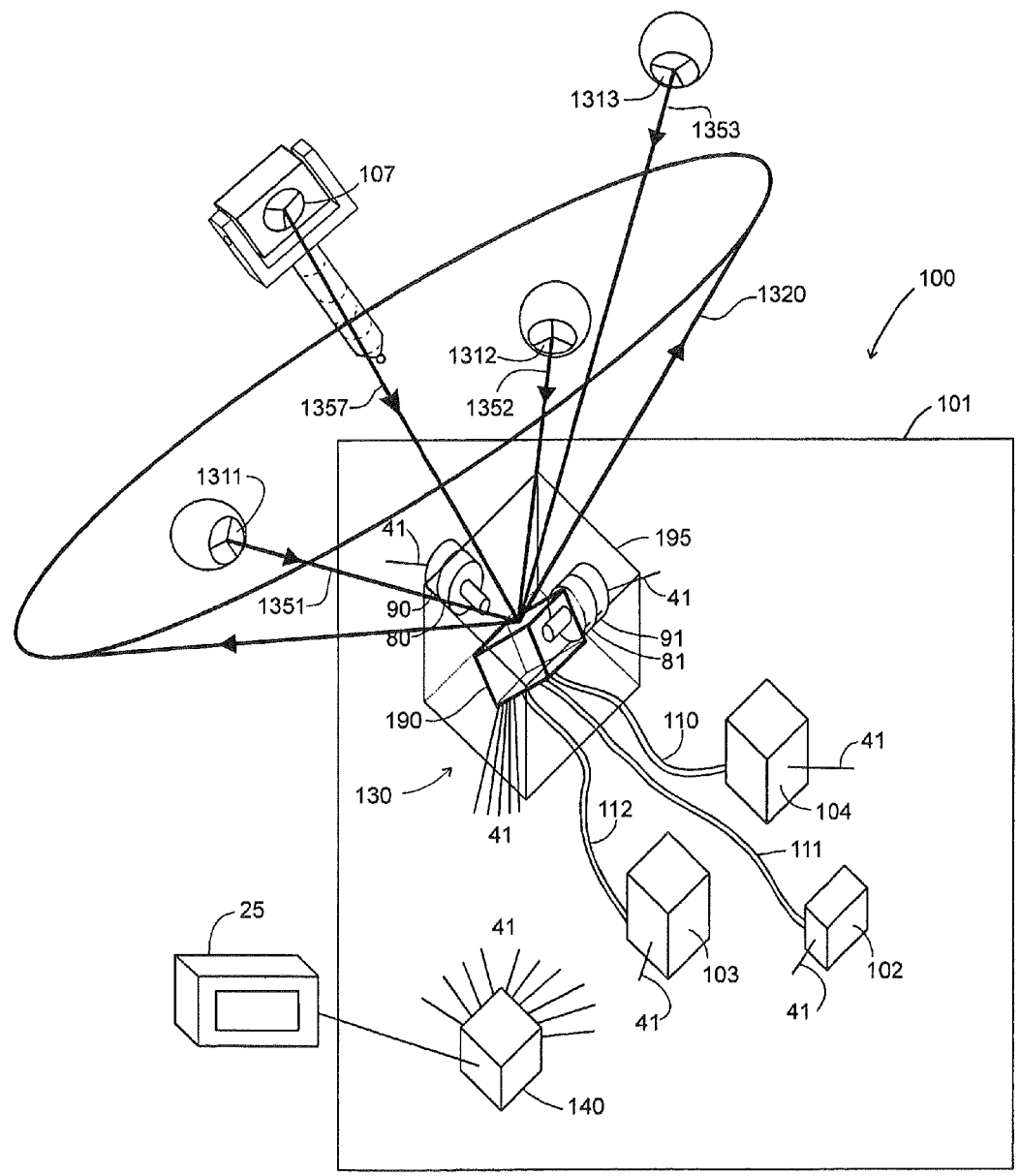
FIG. 13 depicts the laser tracker of FIG. 1 where the rigid structure is rotated to enable a wide-field locator camera to simultaneously view plural retroreflector targets.

The locator-camera block 230 of FIG. 2 allows laser tracker 100 to quickly determine the approximate location of multiple retroreflectors within a wide field of view. The locator camera is shown in greater detail in FIGS. 14a and 14b. As shown in FIG. 2, locator-camera block 230 is placed to one side of rigid structure 190 and has an aperture at 231, which might be considered the "top" side of rigid structure 190. When rigid structure 190 is rotated about the center of shaft 270, locator-camera block 230 faces the retroreflectors in the region of interest. Locator-camera block 230 then emits cone of light 1320 as shown in FIG. 13. This light reflects off retroreflectors 107, 1311, 1312, and 1313 shown in FIG. 13. Here, retroreflector 107 represents a target of interest and retroreflectors 1311, 1312, and 1313 represent a number of other targets. The corresponding reflected light bundles 1357, 1351, 1352, and 1353 enter rigid structure 190. The light entering locator-camera block 230 falls onto a photosensitive array 1404 in FIG. 14b, and the pattern is analyzed to determine the approximate location of the targets in the region of interest.

Figure 14A:
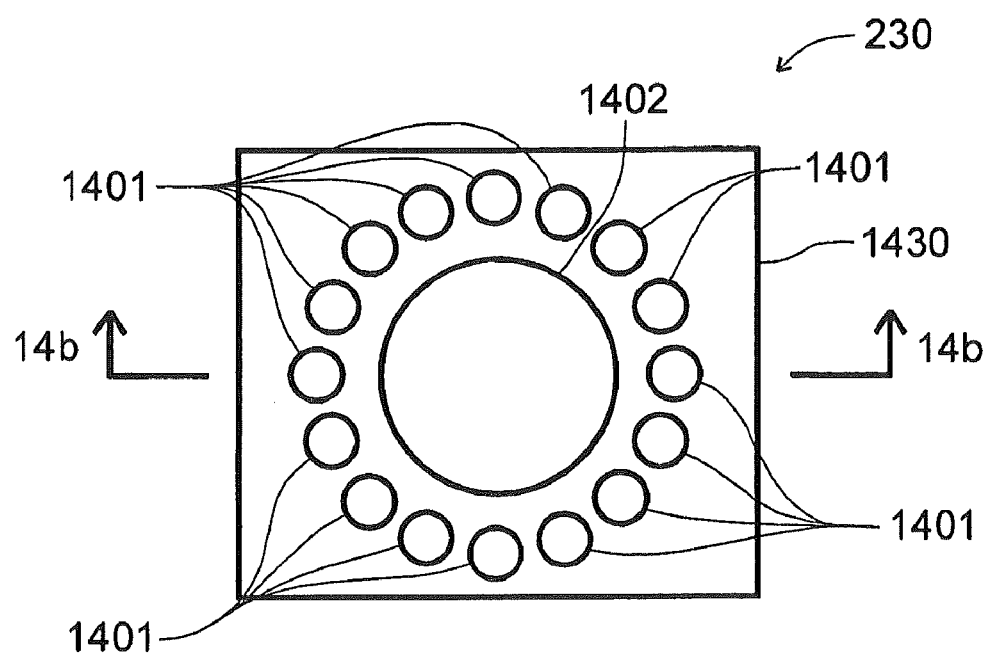
FIG. 14a is a front view of the locator camera on the rigid structure.
Figure 14B:
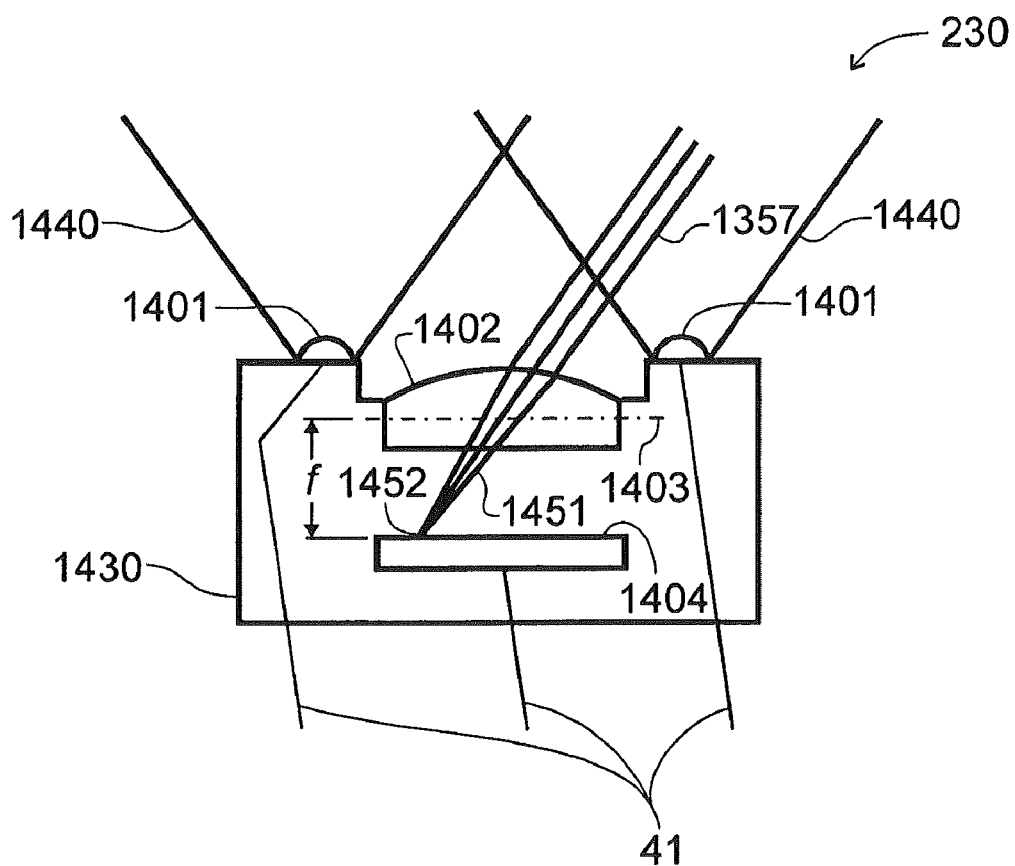
FIG. 14b is a cross sectional view of the locator camera of FIG. 14a taken along line 14b-14b.

FIGS. 14a and 14b depict an example locator-camera arrangement. A plurality of identical light sources 1401 is provided in a ring surrounding a lens 1402. The individual light sources emit overlapping cones of essentially incoherent light 1440 that collectively constitute the cone of light 1320 in FIG. 13. Each of the retroreflectors 107, 1311-1313 reflects some of the light from the cone of light 1320 back to the locator-camera block 230 as the bundles of light 1351-1353 or 1357. The bundle of light 1357 is shown in FIG. 14b. Lens 1402 focuses the bundle 1357 down to a spot on the surface of photosensitive array 1404. The photosensitive array 1404 is separated from the front principal plane, 1403, of lens 1402 by the focal length f of the lens.

Electrical wires 41 provide power from electronics box 140 to light emitters 1401 and photosensitive array 1404. Electrical wires 41 also transmit the pixel data from photosensitive array 1404 to electronics box 140 for analysis. Electronics box 41 analyzes the pattern of light on photosensitive array 1404 to determine the location of central point 1452 on photosensitive array 1404. Electronics box 140 also performs this analysis of the pattern formed by the other bundles of light returned by the retroreflectors. In other words, reflected light bundles 1357, 1351, 1352, and 1353 are focused by lens 1402 into patterns on photosensitive array 1404. Electronics box analyzes these patterns to determine the central point of each pattern. From the location of the central points, the approximate angular direction to each of the retroreflectors can be determined.

Suppose that the retroreflector of interest is retroreflector 107. Once the information from the locator camera has been used to determine the approximate direction to retroreflector 107, motors 80 and 81 are activated to turn rigid structure 190 until laser beam 153 points in the approximate direction of retroreflector 107. The tracker then begins a search pattern, in which the direction of laser beam 153 is changed in a systematic fashion. For example, the laser beam might be steered along a spiral pattern. When the laser beam intersects the target, position detector 341 of FIG. 3 senses the reflected light. The signals from position detector 341 provide enough information to enable motors 80 and 81 to point rigid structure 190 directly to the center of retroreflector 107.

Figure 15A:
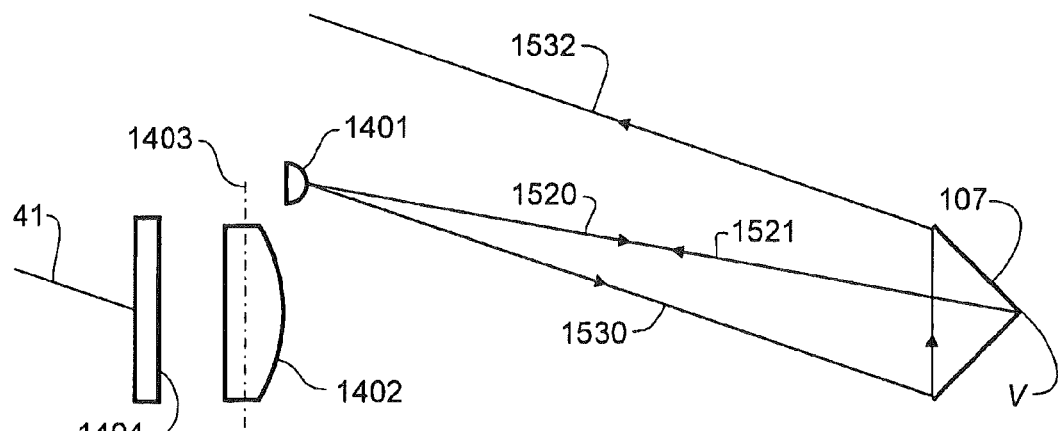
FIGS. 15a-15c depict the formation of an image on the wide-field locator camera.

FIG. 15a shows rays of light emitted by light emitter 1401 located above lens 1402. Ray of light 1520 travels to vertex V of retroreflector 107. Reflected light 1521 is sent directly back to light emitter 1401. It does not enter lens 1402 or appear as a spot of light on photosensitive array 1404. Ray of light 1530 is sent to the bottom of retroreflector 107 and emerges as reflected light 1532. It also misses lens 1402 and photosensitive array 1404.

Figure 15B:
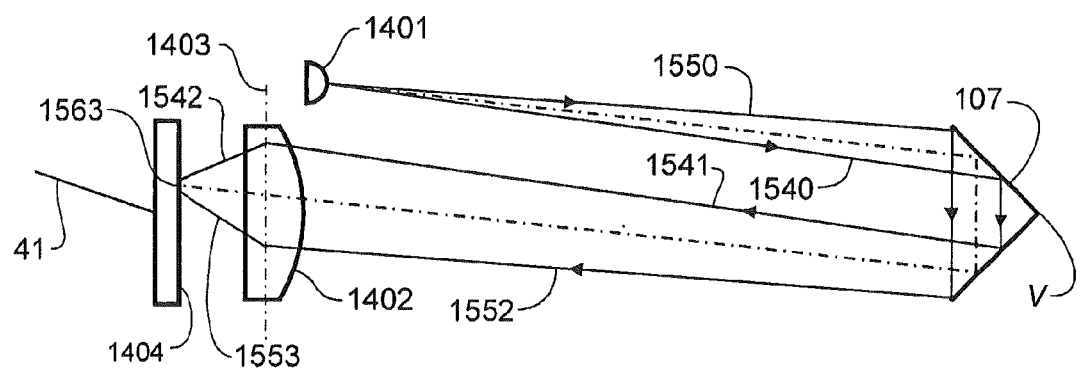

FIG. 15b shows additional rays of light from light emitter 1401 located above lens 1402. Light emitter 1401 sends ray of light 1540 to a location above vertex V on retroreflector 107. This ray emerges as reflected ray 1541, which passes near the top of lens 1402, is bent into ray 1542, and arrives at photosensitive array 1404 near central point 1563. Light emitter 1401 sends ray of light 1550 to the top of retroreflector 107. This ray emerges as reflected ray 1552, which travels to lens 1402, is bent into ray 1553, and arrives at photosensitive array 1404 near central point 1563. As the distance from light emitter 1401 to retroreflector 107 increases, rays 1541 and 1552 become nearly parallel, and the spot of light about point 1563 gets smaller and smaller.

Figure 15C:
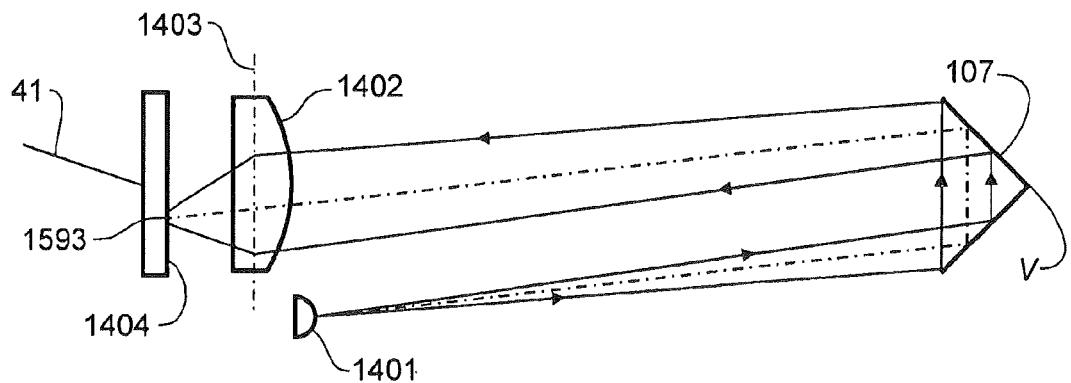

FIG. 15c shows rays of light from light emitter 1401 located below lens 1402. The rays of light in the bottom diagram are mirror images of the rays in the middle diagram. If N is the number of pixels in photosensitive array 1404, W is the width of photosensitive array 1404, D is the diameter of lens 1402, and h is the distance from the edge of lens 1402 to light emitters 1401, the number of pixels between central points 1563 and 1593 will, in most cases, be less than $[2N(D+h)/L] \arctan(W/2f)$. For example, if N=512, D=25 mm, h=5 mm, L=3 m, W=13 mm, and f=10 mm, the number of pixels between central points 1563 and 1593 will be less than six. Since light emitters 1401 are arranged in a circle, the image will be symmetrical, somewhat blurry, and about six pixels across. For retroreflectors further than 3 meters away, as most will be, the pattern of dots will be smaller. Electrical signals are sent from photosensitive array 1404 through electrical wire 41 to electronics box 140. Electronics box 140 analyzes the intensity of light in the pixels to obtain the best estimate of the center of the pattern produced by each retroreflector.

Routing of Optical Fibers

Figure 16:
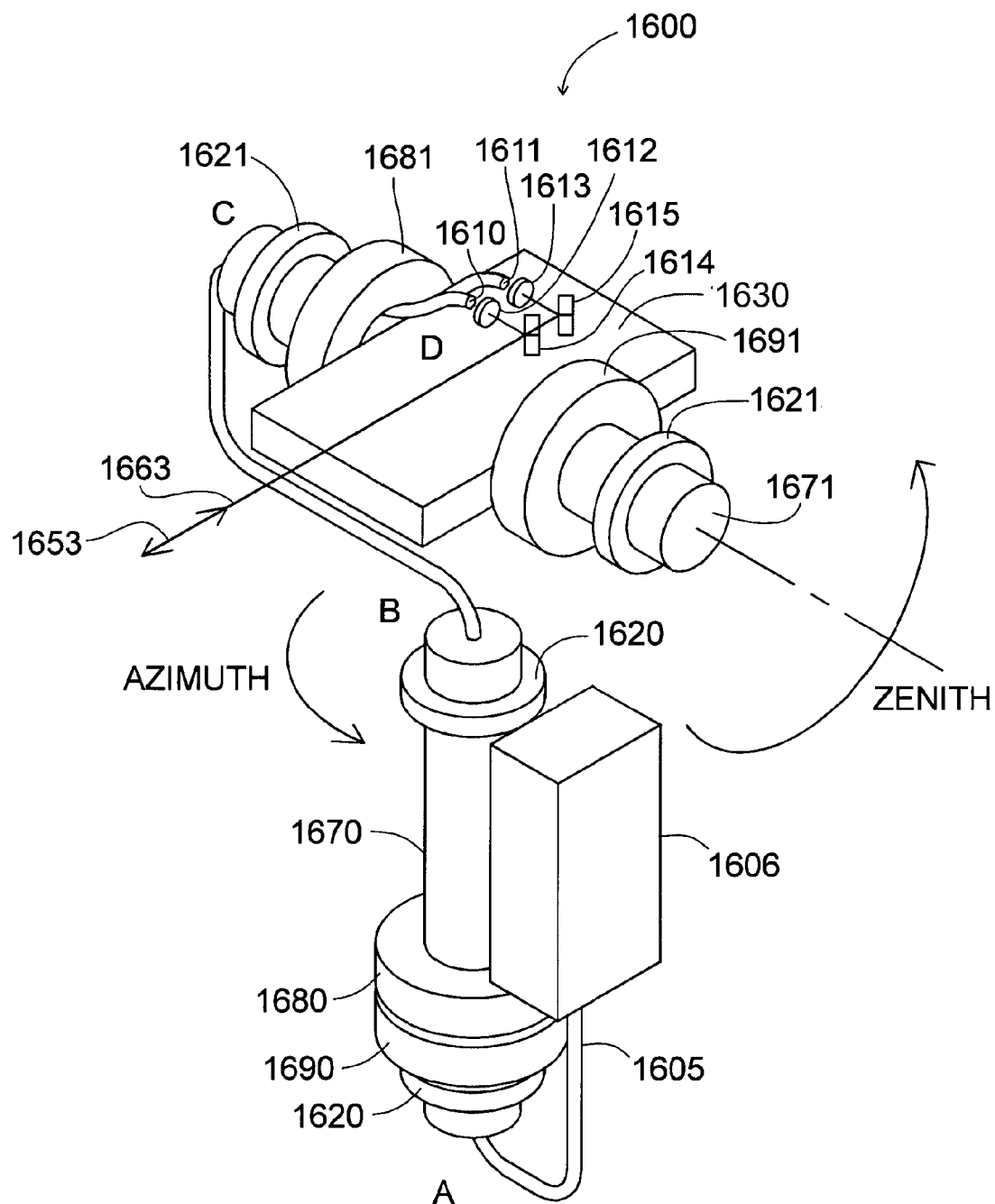
FIG. 16 depicts a method of routing optical fibers near the two mechanical axes.

FIG. 16 shows a configuration of a fiber launch laser tracker 1600 for providing advantageous routing of optical fibers. Here, optical fibers are preferably routed close to the two mechanical axes 1670 and 1671. The routing of the optical fibers in the system of FIG. 16 has many advantages. For example, a large angular field of view of the tracker can be obtained. Also, bending or kinking of the optical fibers is prevented, thereby preserving measurement accuracy. Laser beam 1653, which is launched from rigid plate 1630, travels to retroreflector 107 as shown in FIG. 1 and returns as laser beam 1663. Laser light from optical fiber 1611 is collimated by lens 1613, reflected by mirror 1615, and transmitted through beam splitter 1614. Laser light from optical fiber 1610 is collimated by lens 1612 and reflected off beamsplitter 1614. Any number of laser beams can be combined into a common path to form outgoing laser beam 1653. Returning laser light may pass through a number of elements as previously discussed and omitted in FIG. 16 for clarity. For example, beam splitters for the position detector and the orientation camera may be employed in accordance with the specific application. The returning laser light may reflect off beam splitter 1614 and pass through lens 1612 to be coupled into optical fiber 1610. Alternatively, the laser light may pass into another device located on rigid plate 1630 for processing as previously discussed, for example, with reference to the absolute distance meter and the interferometer. Similarly, the returning laser light may reflect off mirror 1615 and couple back into optical fiber 1611. Alternatively, this laser light may travel to another device on rigid plate 1630 for processing.

The direction of laser beam 1653 is determined by the orientation of rigid plate 1630, which in turn is determined by the angle of rotation of the zenith mechanical axis 1671 and the azimuth mechanical axis 1670. The zenith motor 1681 rotates the zenith axis 1671, and the azimuth motor 1680 rotates the azimuth axis 1670. Zenith angular encoder 1691 and the azimuth angular encoder 1690 measure the zenith and azimuth angles. Bearings 1681 and 1680 are also attached to the zenith and azimuth axes. The outside of zenith bearings 1621, zenith angular encoder 1691, and zenith motor 1681 are attached to the azimuth structural frame (not shown). The azimuth structural frame turns with the azimuth axis. Consequently, the zenith axis rotates within the azimuth structural frame. The outside of azimuth bearings 1620, azimuth angular encoder 1690, and azimuth motor 1680 are attached to stationary structural frame (not shown). The stationary structural frame is stationary with respect to the surroundings to which the tracker is mounted. Consequently, the azimuth axis rotates within the stationary structural frame.

Optical fibers 1610 and 1611 are incorporated into optical fiber assembly 1605. Optical fiber assembly 1605 passes through zenith axis 1671 and azimuth axis 1670. Lasers within optoelectronic module 1606 (which, like the azimuth motor 1680, is stationary) inject laser light into optical fibers 1610 and 1611. Optoelectronic module 1606 may also contain optical detectors and electronics to determine the distance to retroreflector 107 or to a diffuse surface under investigation. The optical fiber assembly 1605 travels from optoelectronic module 1606 to the underside of azimuth axis 1670. It is attached to the stationary structural frame near point A shown in FIG. 16. At point A, the fiber is stationary with respect to the rotating azimuth axis. At the other end of the azimuth axis, optical fiber assembly 1605 is attached to the azimuth structural frame near point B, which rotates along with azimuth axis 1670. Since one end of the fiber is fixed and the other end of the fiber is rotating with respect to the rotation of the azimuth axis, the optical fiber will experience a torsional twist. In most cases, a gentle twist of this sort will not degrade measurement accuracy. Optical fiber assembly 1605 is routed to the zenith axis, where it is attached to the azimuth structural frame near point C, At point C, the fiber is stationary with respect to the rotating zenith axis. At the other end of the zenith axis, fiber assembly 1605 is attached near point D, which rotates along with the zenith axis 1671.

Optical fiber assembly 1605 is routed through the two mechanical axes. The fiber assembly is stationary at one end of each axis. At the other end, the fiber assembly rotates along with the axis. This produces a torsional twist, which is acceptable in most situations. A slightly different method of routing optical fiber assembly 1605 near the two mechanical axes may be preferable in some cases. In this method, the optical fibers are placed in coils to the outside of the mechanical axes, with the end of the optical fiber attached at one end to a point that is stationary relative to the mechanical axis and at the other end attached to a point that moves with the mechanical axis. Here, the diameter of the coils will change slightly as the axis is rotated. In most cases, this small change in the radius of the coiled fiber assembly will not adversely affect measurement accuracy. By heat treating fiber assemblies, it is possible to make low-cost cables that naturally coil into the desired geometry, thereby simplifying production and increasing reliability.

Second Embodiment

Figure 17:
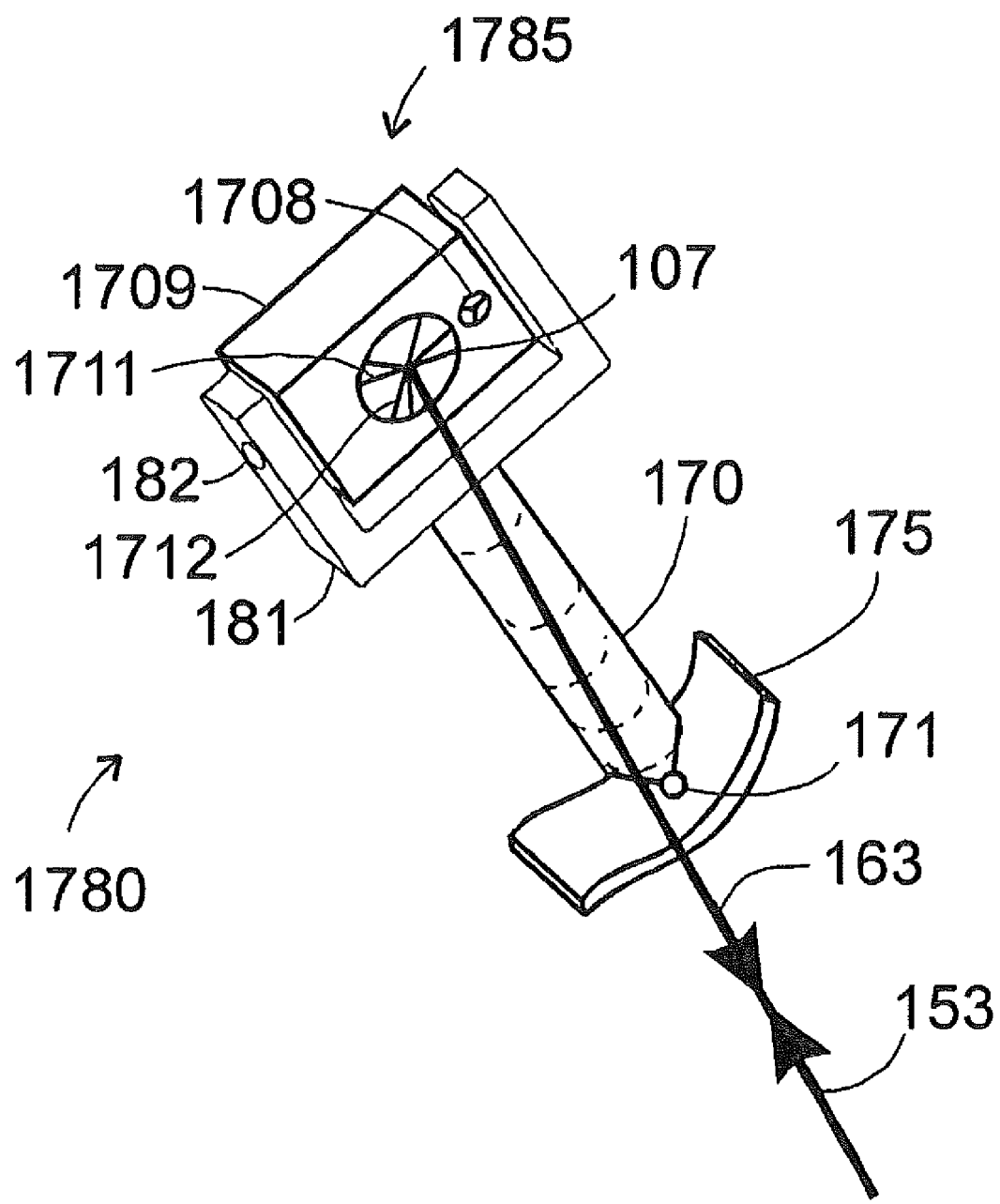
FIG. 17 depicts a probe assembly of the preferred second embodiment.

The second embodiment of the invention is generally similar to that shown in FIG. 1 except for the probe assembly 180 is replaced by probe assembly 1780, as shown in FIG. 17. Probe assembly 1780 contains a single small retroreflector 1708 to the side of retroreflector 107. Retroreflector 1708 is approximately aligned with the first line of intersection. At the start of the measurement, the photosensitive array 725 of FIG. 7 displays a pattern similar to that of FIG. 12, with the details of the pattern dependant on the pitch, yaw, and roll angles of retroreflector 107. As explained previously, at the start of the measurement, it is not possible to tell which line segments correspond to each of the three lines of intersection. To resolve this ambiguity, the tracker performs a search in which it directs laser beam 153 in succession to each of the six possible locations of retroreflector 1708. A flash of light on position detector 341 of FIG. 3 indicates that the first line of intersection has been identified. Also on probe assembly 1780, two thin wires 1711 and 1712 have been stretched across the top of retroreflector 107. Additional thin wires or alternative shapes may also be used. These wires provide redundant information for determining the pitch, yaw, and roll angles for those cases in which accuracy is more important than measurement speed.

Probe assemblies 180 and 1780 can be used in either a scanning mode or a trigger mode. In the scanning mode, probe tip 171, shown in FIGS. 1 and 17, is moved across the surface of the object under evaluation 175 while data is continually collected at a high rate. In the trigger mode, probe 180 or 1780 is moved successively to the points of interest. When the probe is properly positioned, the operator triggers the measurement by performing an action such as pressing a button or issuing a voice command.

Either target object 185 in the first preferred embodiment or target object 1785 in the second preferred embodiment can be detached from adjustable stage 181 and probe shaft 170, then attached to the end effector of a robot arm. Alternatively, the target object can be attached to a machine tool such as a drilling or milling machine. The tracker sends a laser beam to the target object to determine the six degrees of freedom of the drill or mill. The information provided by the tracker on the six degrees of freedom of target object 185 or 1785 can be used in a control loop to precisely direct the machine tool or robot end effector to the desired locations. If the tracker measures the six degrees of freedom fast enough, real-time control of machine tools and robots is possible.

Third Embodiment

Figure 18:
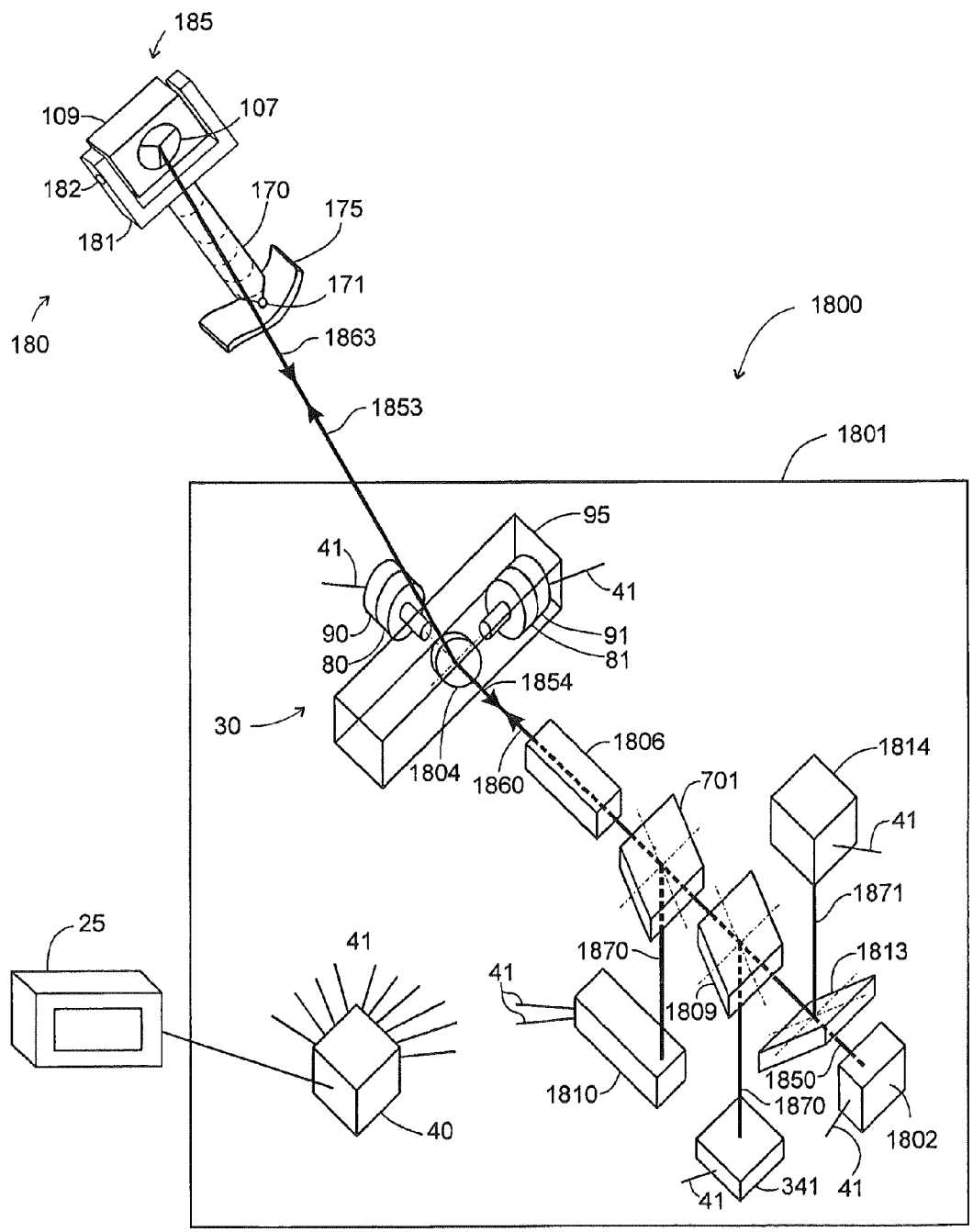
FIG. 18 depicts a conventional laser tracker to which an orientation camera has been added for measuring six degrees of freedom.

The third embodiment of the invention provides a laser tracker 1800 as shown in FIG. 18 that uses a steering reflector 1804 within gimbal mount 95 to direct laser beam 1853 to retroreflector 107. Laser 1802 emits laser light that is sent to retroreflector 107. Optical block 1806 contains beam expander 220 and any other optical beam-conditioning elements that may be required. Laser light returning from retroreflector 107 is sent to distance-measuring device 1814, which may be either an absolute-distance meter or an incremental-distance meter. Part of the returning laser light is also reflected off beam splitter 1809 to position detector 341. The beam splitter 701 reflects a portion of laser beam 54 into orientation-camera subsystem 1810. Orientation camera subsystem 1810 comprises afocal lens block 710 and relay/array block 720, also shown in FIG. 7. The optical elements within blocks 1806 and 1810 of FIG. 18 are substantially equivalent to the optical elements within blocks 220 and 210 of FIGS. 6 and 7. In effect, an orientation camera comprising elements 701 and 1810 is embedded within laser tracker 1800. This orientation camera is equivalent to the orientation camera 210 of FIG. 2 and can therefore be used to measure the six degrees of freedom of target object 185.

It will be apparent to those skilled in the art that various modifications and variations can be made in the laser-based coordinate measuring device of the present invention without departing from the spirit or scope of the invention. Thus, it is intended that the present invention covers the modifications and variations of this invention provided they come within the scope of the appended claims and their equivalents.

What is claimed is:

1. A method for using a laser tracker to measure a location and an orientation of a patterned target that includes a pattern and a retroreflector, with steps comprising:
   providing a structure that includes a first optical system and at least a portion of a distance meter that launches a beam to the patterned target;
   automatically tracking movement of the patterned target and directing the beam toward the patterned target;

reflecting from the patterned target a portion of the beam as a reflected beam;

measuring the location of the patterned target, where the location includes a first angle, a second angle, and a distance, wherein:

the first angle is measured at least in part by a first encoder;

the second angle is measured at least in part by a second encoder; and the distance is measured by the distance meter at least in part based on a portion of the reflected beam and the speed of light;

providing a second optical system, which includes a first lens, that forms a first image of at least a portion of the patterned target on a photosensitive array;

converting the first image into a digital data set; and calculating the orientation, which comprises a first orientation angle, of the patterned target, based at least in part on the digital data set.

2. The method of claim 1, wherein:

the orientation further comprises a second orientation angle; and the laser tracker measures at least five degrees of freedom.

3. The method of claim 2, wherein:

the orientation further comprises a third orientation angle; and the laser tracker measures six degrees of freedom.

4. The method of claim 1, further including:

adjusting a motor to keep the first image focused on or near the photosensitive array.

5. The method of claim 4, wherein the motor is adjusted based at least in part on the distance.

6. The method of claim 1, wherein providing the second optical system comprises providing an afocal subsystem.

7. The method of claim 1, further comprising:

providing the retroreflector in the form of a cube-corner retroreflector that comprises three perpendicular reflecting surfaces.

8. The method of claim 1, further comprising:

providing the retroreflector in the form of a hollow-core cube-corner retroreflector.

9. The method of claim 1, further comprising:

providing the retroreflector in the form of a solid glass cube-corner retroreflector.

10. The method of claim 7, wherein the pattern is formed by at least a portion of three lines of intersection of the three perpendicular reflecting surfaces.

11. The method of claim 1, further including a step of measuring coordinates of a probe tip, wherein the probe tip is located on a probe assembly that comprises the patterned target.

12. The method of claim 1, further including a step of attaching the patterned target on a machine tool or an end effector of a robot.

13. The method of claim 1, further comprising:

mounting the second optical system on the structure.

14. The method of claim 7, further comprising:

forming the retroreflector such that it creates the pattern as part of the reflected beam.

15. The method of claim 8, further comprising:

forming the retroreflector such that it creates the pattern as part of the reflected beam.

16. The method of claim 9, further comprising:

forming the retroreflector such that it creates the pattern as part of the reflected beam.

17. A laser tracker for measuring a location and an orientation of a patterned target that includes a pattern and a retroreflector, the laser tracker comprising:

a structure, rotatable about a first axis and a second axis, from which a first beam is launched to the patterned target and to which a second beam is reflected from the patterned target, a position detector disposed on the structure that collects a portion of the second beam, the position detector generating a signal indicating a direction the structure is to be rotated in order to cause the first beam to track the patterned target;

a subsystem for measuring the location of the patterned target, the subsystem including a first encoder that measures a first angle of rotation of the structure about the first axis, a second encoder that measures a second angle of rotation of the structure about the second axis, and a distance meter that measures a distance from the structure to the patterned target an optical system, disposed on the structure, the optical system including a first lens that forms an image of at least a portion of the patterned target on a photosensitive array;

a first electronics system that converts the image into a digital data set; and a second electronics system that calculates the orientation of the patterned target, the orientation of the patterned target including a first orientation angle, of the patterned target based at least in part on the digital data set.

18. The laser tracker of claim 17 wherein:

the orientation of the patterned target further comprises a second orientation angle; and the laser tracker measures at least five degrees of freedom.

19. The laser tracker of claim 18, wherein:

the orientation of the patterned target further comprises a third orientation angle; and the laser tracker measures six degrees of freedom.

20. The laser tracker of claim 17, further comprising:

a motor coupled to the lens that adjusts the position of the lens to keep the image focused on or near the photosensitive array.

21. The laser tracker of claim 20, wherein the motor adjusts the position of the lens based at least in part on the distance.

22. The laser tracker of claim 17, wherein a transverse magnification of the second optical system is essentially constant as a function of the distance.

23. The laser tracker of claim 17, wherein the second optical system comprises an afocal subsystem.

24. The laser tracker of claim 17, wherein the distance meter measures an absolute distance.

25. The laser tracker of claim 17, wherein the retroreflector comprises a cube-corner retroreflector comprising three perpendicular reflecting surfaces.

26. The laser tracker of claim 25, wherein the retroreflector comprises a hollow-core cube-corner retroreflector.

27. The laser tracker of claim 25, wherein the retroreflector comprises a solid glass cube-corner retroreflector.

28. The laser tracker of claim 25, wherein the pattern is formed by at least a portion of three lines of intersection of the three perpendicular reflecting surfaces.

29. The laser tracker of claim 17, further comprising a probe tip attached to the patterned target.

30. The laser tracker of claim 17, further comprising a machine tool or robot end effector to which the patterned target is attached.

31. The laser tracker of claim 17, wherein the second optical system is mounted on the structure.

32. The laser tracker of claim 17, wherein the retroreflector causes the second beam to include the pattern.

* * * * *